(12) United States Patent
Tamaki et al.

(10) Patent No.: US 9,377,224 B2
(45) Date of Patent: Jun. 28, 2016

(54) HEAT PUMP APPARATUS AND CONTROL METHOD FOR HEAT PUMP APPARATUS

(75) Inventors: Shogo Tamaki, Tokyo (JP); Makoto Saito, Tokyo (JP); Masanobu Baba, Tokyo (JP); Ryo Oya, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 443 days.

(21) Appl. No.: 13/981,505

(22) PCT Filed: Jan. 27, 2011

(86) PCT No.: PCT/JP2011/051608
§ 371 (c)(1),
(2), (4) Date: Jul. 24, 2013

(87) PCT Pub. No.: WO2012/101804
PCT Pub. Date: Aug. 2, 2012

(65) Prior Publication Data
US 2013/0306301 A1 Nov. 21, 2013

(51) Int. Cl.
*F25B 30/00* (2006.01)
*F25B 13/00* (2006.01)
(Continued)

(52) U.S. Cl.
CPC .............. *F25B 30/00* (2013.01); *F24D 17/001* (2013.01); *F24D 17/02* (2013.01);
(Continued)

(58) Field of Classification Search
CPC .......... F25B 13/00; F25B 30/00; F25B 41/04; F25B 2313/005; F25B 2313/009; F25B 2313/0292; F25B 2313/0314; F25B 2313/0315; F25B 2339/047; F25B 2700/21161; F25B 2700/21163; F24D 17/001; F24D 17/02; F24D 19/12; F24D 2200/12; Y02B 30/52

See application file for complete search history.

(56) References Cited

U.S. PATENT DOCUMENTS

| 4,646,538 A | 3/1987 | Blackshaw et al. |
| 2013/0145786 A1* | 6/2013 | Tamaki .................. F25B 13/00 62/161 |

(Continued)

FOREIGN PATENT DOCUMENTS

| EP | 0 151 493 A2 | 8/1985 |
| EP | 2 557 377 A1 | 2/2013 |

(Continued)

OTHER PUBLICATIONS

International Search Report of the International Searching Authority mailed May 17, 2011 for the corresponding international application No. PCT/JP2011/051608 (with English translation).

(Continued)

*Primary Examiner* — Marc Norman
(74) *Attorney, Agent, or Firm* — Posz Law Group, PLC

(57) ABSTRACT

A heat pump apparatus includes a heat source unit that cools or heats a refrigerant, an indoor unit that performs a cooling operation, and a hot water supply unit that performs a hot water supply operation. When there is an operation request for one of the indoor unit and the hot water supply unit, even when there is no operation request for the other, the heat pump apparatus causes both the one and the other to operate if the other satisfies a certain condition so that the hot water supply unit performs a hot water supply operation by utilizing a refrigerant heated by performing a cooling operation in the indoor unit and the indoor unit performs a cooling operation by utilizing a refrigerant cooled by performing a hot water supply operation in the hot water supply unit.

14 Claims, 20 Drawing Sheets

(51) Int. Cl.
F25B 41/04 (2006.01)
F24D 17/00 (2006.01)
F24D 17/02 (2006.01)
F24D 19/10 (2006.01)

(52) U.S. Cl.
CPC ........... F24D 19/1054 (2013.01); F25B 13/00 (2013.01); F25B 41/04 (2013.01); *F24D 2200/12* (2013.01); *F24D 2200/24* (2013.01); *F25B 2313/005* (2013.01); *F25B 2313/009* (2013.01); *F25B 2313/021* (2013.01); *F25B 2313/0214* (2013.01); *F25B 2313/0292* (2013.01); *F25B 2313/02741* (2013.01); *F25B 2313/0314* (2013.01); *F25B 2313/0315* (2013.01); *F25B 2339/047* (2013.01); *F25B 2600/2515* (2013.01); *F25B 2600/2519* (2013.01); *F25B 2700/21161* (2013.01); *F25B 2700/21163* (2013.01); *Y02B 10/70* (2013.01); *Y02B 30/52* (2013.01)

(56) References Cited

U.S. PATENT DOCUMENTS

2013/0312443 A1* 11/2013 Tamaki ................. F25B 49/022
62/228.1

2014/0196482 A1* 7/2014 Pelligrini ................. F25B 27/02
62/79

FOREIGN PATENT DOCUMENTS

| JP | 59-133973 U | 9/1984 |
| JP | 59-231354 A | 12/1984 |
| JP | 62-242774 A | 10/1987 |
| JP | 01-285758 A | 11/1989 |
| JP | 10-089791 A | 4/1998 |
| JP | 2001-248937 A | 9/2001 |
| JP | 2007-218463 A | 8/2007 |

OTHER PUBLICATIONS

Extended European Search Report mailed Jun. 24, 2014 issued in the corresponding EP patent application No. 11857381.5.
Office Action mailed Jun. 3, 2014 issued in the corresponding JP patent application No. 2012-554585 (and English translation).
Office Action dated Dec. 2, 2014 issued in corresponding CN patent application No. 201180066069.9 (and English translation).
Extended European Search Report mailed Aug. 25, 2014 issued in the corresponding EP patent application No. 14170984.0.

* cited by examiner

FIG. 24  SIMULTANEOUS COOLING/WATER WARMING/HOT WATER SUPPLY OPERATION MODE H

HEAT PUMP APPARATUS AND CONTROL METHOD FOR HEAT PUMP APPARATUS

CROSS REFERENCE TO RELATED APPLICATIONS

This application is a U.S. national stage application of International Application No. PCT/JP2011/051608 filed on Jan. 27, 2011.

TECHNICAL FIELD

The present invention relates to a heat pump apparatus capable of simultaneously executing an air conditioning operation (cooling operation, heating operation) and a hot water supply operation. More particularly, the present invention relates to a heat pump apparatus capable of sufficiently exercising the energy saving capacity by performing a waste heat recovery operation.

BACKGROUND ART

Patent Literature 1 describes a heat pump apparatus including a refrigerant circuit in which a heat source unit, a use unit, and a hot water supply unit are connected with pipes.

This heat pump apparatus allows an air conditioning operation and a hot water supply operation to be independently executed in a single system, and allows the air conditioning operation and the hot water supply operation to be simultaneously executed. This heat pump apparatus makes it possible for the hot water supply unit to recover the waste heat of the use unit when the cooling operation of the use unit and the hot water supply operation of the hot water supply unit are simultaneously executed, and can achieve an efficient operation.

CITATION LIST

Patent Literature

Patent Literature 1: Japanese Unexamined Patent Application Publication No. 2001-248937

SUMMARY OF INVENTION

Technical Problem

In the heat pump apparatus described in Patent Literature 1, three modes of operations, namely, a cooling operation, a cooling/hot water storage operation, and a hot water storage operation, are selectable in accordance with the presence or absence of a cooling operation command and the temperature of the hot water in a hot water storage tank. Specifically, it is described that when there is a cooling operation command, the cooling/hot water storage operation is performed to recover waste heat if the temperature of the hot water in the hot water storage tank is higher than 45 degrees C., and a cooling operation mode is used otherwise.

In this method, however, there is no opportunity to perform a waste heat recovery operation when there is no cooling operation command or when the cooling load and the hot water supply load are not concurrently generated such as when the temperature of the hot water in the hot water storage tank is equal to the set value, or 45 degrees C. Hence, the high energy saving capacity of the heat pump apparatus may not be sufficiently exercised.

It is an object of the present invention to sufficiently exercise the energy saving capacity by actively recovering waste heat.

Solution to Problem

A heat pump apparatus according to the present invention includes
- a heat source device that cools or heats a refrigerant,
- a first use device that cools a first fluid by utilizing the refrigerant cooled by the heat source device,
- a second use device that heats a second fluid by utilizing the refrigerant heated by the heat source device, and
- a controller that causes, when there is an operation request for one of the first use device and the second use device, even when there is no operation request for the other, both the one and the other to operate if the other satisfies a certain condition, and causes the first use device and the second use device to perform a waste heat recovery operation in which the second use device heats the second fluid by utilizing a refrigerant heated by cooling the first fluid in the first use device and in which the first use device cools the first fluid by utilizing a refrigerant cooled by heating the second fluid in the second use device.

Advantageous Effects of Invention

In the heat pump apparatus according to the present invention, when there is an operation request for one of a first use device and a second use device, even when there is no operation request for the other, both the first use device and the second use device are caused to operate if the other satisfies a certain condition, and a waste heat recovery operation is executed. This increases the opportunities for a waste heat recovery operation, and the energy saving capacity can be sufficiently exercised.

DESCRIPTION OF EMBODIMENTS

Embodiment 1

First, the configuration of a heat pump apparatus 100 according to Embodiment 1 will be described.

Figure 1:
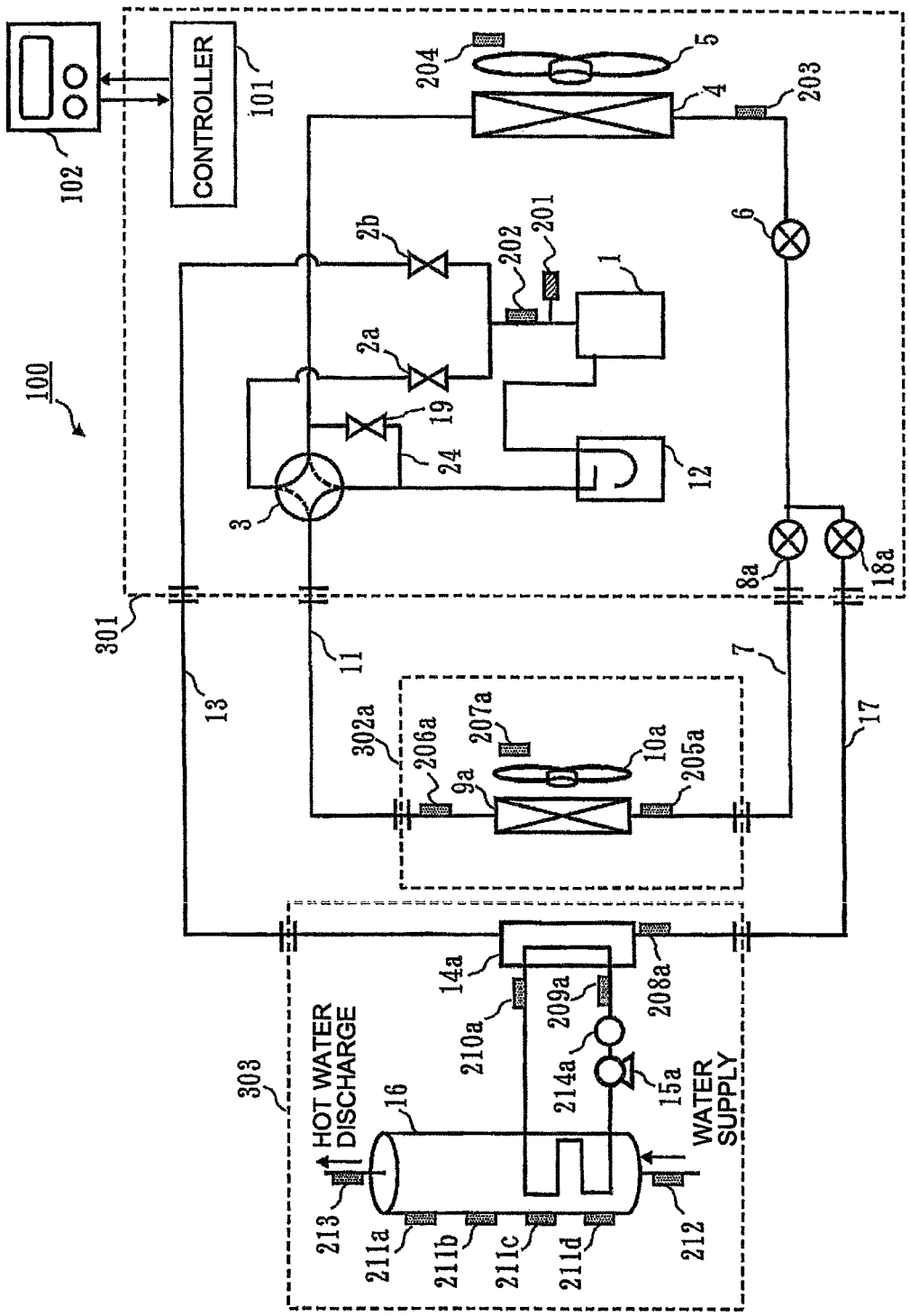
FIG. 1 is a refrigerant circuit configuration diagram of a heat pump apparatus 100 according to Embodiment 1.

FIG. 1 is a refrigerant circuit configuration diagram of the heat pump apparatus 100 according to Embodiment 1.

The heat pump apparatus 100 according to Embodiment 1 includes an annular first refrigerant passage in which a compressor 1, a solenoid valve 2a (first opening and closing mechanism), a four-way valve 3 (switching mechanism), a heat exchanger 4 (first heat exchanger), a pressure reducing mechanism 6 (first pressure reducing mechanism), a pressure reducing mechanism 8a (second pressure reducing mechanism), a heat exchanger 9a (second heat exchanger), and an accumulator 12 are sequentially connected with pipes. The heat pump apparatus 100 further includes a second refrigerant passage that connects a node between the pressure reducing mechanism 6 and the pressure reducing mechanism 8a to a node between the compressor 1 and the solenoid valve 2a with pipes, in which a pressure reducing mechanism 18a (third pressure reducing mechanism), a heat exchanger 14a (third heat exchanger), and a solenoid valve 2b (second opening and closing mechanism) are sequentially connected. The first refrigerant passage and the second refrigerant passage constitute a refrigerant circuit. A refrigerant circulates in the refrigerant circuit. The heat pump apparatus 100 further includes a bypass pipe 24 (bypass passage) that connects a pipe connecting the solenoid valve 2a to the heat exchanger 4 through the four-way valve 3 and a pipe connecting the heat exchanger 9a to the compressor 1 through the four-way valve 3 and the accumulator 12 and that is provided with a solenoid valve 19 (third opening and closing mechanism) in the middle thereof.

The heat pump apparatus 100 further includes a first water circuit in which the heat exchanger 14a, a water pump 15a, and a hot water storage tank 16 are sequentially connected with pipes. Water, which is a heat exchange medium, circulates as intermediate water in the first water circuit.

The heat pump apparatus 100 includes three devices, namely, a heat source unit 301 (heat source device), an indoor unit 302a (first use device), and a hot water supply unit 303 (second use device). The heat source unit 301 and the indoor unit 302a are connected with a pipe 7 and a pipe 11. Further, the heat source unit 301 and the hot water supply unit 303 are connected with a pipe 13 and a pipe 17.

The heat pump apparatus 100 performs a vapor-compression refrigeration cycle operation, thereby being capable of simultaneously processing a cooling command (cooling ON/OFF) or heating command (heating ON/OFF) in the indoor unit 302a and a hot water supply command (hot water supply ON/OFF) in the hot water supply unit 303.

The heat source unit 301 includes the compressor 1, the solenoid valves 2a and 2b, the four-way valve 3, the heat exchanger 4, a fan 5, the pressure reducing mechanism 6, the pressure reducing mechanism 8a, the pressure reducing mechanism 18a, the accumulator 12, and the solenoid valve 19.

The compressor 1 is a compressor whose capacity is controllable by controlling the rotation speed using an inverter. The compressor 1 sucks in and compresses the refrigerant, and discharges a high-temperature, high-pressure refrigerant. The four-way valve 3 switches between a passage (the passage indicated by the solid line in FIG. 1) connecting the pipe 11 and the accumulator 12 and also connecting the solenoid valve 2a and the heat exchanger 4 and a passage (the passage indicated by the broken line in FIG. 1) connecting the pipe 11 and the solenoid valve 2a and also connecting the accumulator 12 and the heat exchanger 4. Accordingly, the four-way valve 3 controls the flow direction of the refrigerant. The heat exchanger 4 is, for example, a cross-fin type fin-and-tube heat exchanger including a heat transfer pipe and multiple fins, and exchanges heat between outside air and the refrigerant. The fan 5 is formed of a centrifugal fan, a multi-blade fan, or the like, which is driven by a DC motor, and is capable of adjusting the amount of air to be sent. The fan 5 is disposed in the vicinity of the heat exchanger 4. The fan 5 causes outdoor air to be sucked into the heat source unit 301 so that the heat exchanger 4 exchanges heat between the refrigerant and the outdoor air, and discharges the outdoor air that has undergone heat exchange to the outside. The pressure reducing mechanism 6, the pressure reducing mechanism 8a, and the pressure reducing mechanism 18a adjust the pressure of the refrigerant. Further, the pressure reducing mechanism 6, the pressure reducing mechanism 8a, and the pressure reducing mechanism 18a control the flow direction of the refrigerant and the flow rate of the refrigerant to be distributed. The accumulator 12 stores excess refrigerant.

The heat source unit 301 is further provided with a pressure sensor 201 and temperature sensors 202, 203, and 204.

The pressure sensor 201 is disposed on the discharge side of the compressor 1, and detects the high-pressure-side pressure of the refrigerant. The temperature sensor 202 is disposed on the discharge side of the compressor 1, and detects the discharge temperature of the refrigerant. The temperature sensor 203 is disposed on the liquid side of the heat exchanger 4, and detects the temperature of the liquid refrigerant. The temperature sensor 204 is disposed on the outdoor air suction inlet side of the heat source unit 301, and detects the temperature of the outdoor air flowing into the unit.

The indoor unit 302a includes the heat exchanger 9a and a fan 10a.

The heat exchanger 9a is, for example, a cross-fin type fin-and-tube heat exchanger including a heat transfer pipe and multiple fins, and exchanges heat between the indoor air (first fluid) and the refrigerant. The fan 10a is formed of a centrifugal fan, a multi-blade fan, or the like, which is driven by a DC motor, and is capable of adjusting the amount of air to be sent. The fan 10a is disposed in the vicinity of the heat exchanger 9a. The fan 10a causes indoor air to be sucked into the heat source unit 301 so that the heat exchanger 9a exchanges heat between the refrigerant and the indoor air, and discharges the indoor air that has undergone heat exchange into the room.

The indoor unit 302a is further provided with temperature sensors 205a, 206a, and 207a.

The temperature sensor 205a is disposed on the liquid side of the heat exchanger 9a, and detects the temperature of the liquid refrigerant. The 206a is disposed on the gas side of the heat exchanger 9a, and detects the temperature of the gaseous refrigerant. The 207a is disposed on the indoor air suction inlet side of the indoor unit 302a, and detects the temperature of the indoor air flowing into the unit.

The hot water supply unit 303 includes the heat exchanger 14a, the water pump 15a, and the hot water storage tank 16.

The heat exchanger 14a is formed of, for example, a plate-type water heat exchanger, and exchanges heat between the intermediate water (second fluid) flowing through the first water circuit and the refrigerant to convert the intermediate water into warm water. The water pump 15a is a pump that allows the intermediate water to circulate through the first water circuit, and makes the flow rate of water to be supplied to the heat exchanger 14a variable. The hot water storage tank 16 stores boiled hot water. The hot water storage tank 16 is always full. The hot water storage tank 16 stores hot water while forming thermal stratification with the upper portion storing high-temperature water and the lower portion storing low-temperature water. In response to a hot water discharge request, the hot water is supplied from the top of the hot water storage tank 16. Low-temperature city water is supplied to the hot water storage tank 16 by an amount by which the amount of hot water has been reduced by the discharge of hot water, and accumulates in the lower portion of the hot water storage tank 16.

In the hot water supply unit 303, the water supplied by the water pump 15a is heated by the refrigerant in the heat exchanger 14a to become warm water, and then flows into the hot water storage tank 16. The warm water undergoes heat exchange with the water in the hot water storage tank 16 as intermediate water without being mixed with the water in the hot water storage tank 16 to become cooled water. Thereafter, the water flows out of the hot water storage tank 16, flows through the water pump 15a, and is supplied again to the heat exchanger 14a to become warm water. Through the process described above, hot water is boiled in the hot water storage tank 16.

The method of heating the water in the hot water storage tank 16 by using the hot water supply unit 303 is not limited to the heat exchange method using intermediate water described above. A heating method including causing the water in the hot water storage tank 16 to flow directly in the first water circuit, causing the heat exchanger 14a to exchange heat to obtain warm water, and returning the warm water again to the hot water storage tank 16 may be used.

The hot water supply unit 303 is further provided with temperature sensors 208a, 209a, 210a, 211a to 211d, 212, and 213, and a flow rate sensor 214a.

The temperature sensor 208a is disposed on the liquid side of the heat exchanger 14a, and detects the temperature of the liquid refrigerant. The temperature sensor 209a is disposed in the water flow-in portion of the heat exchanger 14a in the first water circuit, and detects the temperature (inlet water temperature) of the water flowing into the heat exchanger 14a. The temperature sensor 210a is disposed in the water flow-out portion of the heat exchanger 14a in the first water circuit, and detects the temperature (outlet water temperature) of the water flowing out of the heat exchanger 14a. The temperature sensors 211a to 211d are installed on the interior surface of the hot water storage tank 16, and measure the temperatures of water at the height of the installation positions in the hot water storage tank 16. The temperature sensor 212 is disposed in the water supply portion of the hot water storage tank 16, and detects the temperature of the water flowing into the hot water storage tank 16. The temperature sensor 213 is disposed in the water discharge portion of the hot water storage tank 16, and detects the temperature of the water flowing out of the hot water storage tank 16. The flow rate sensor 214a is disposed between the water pump 15a and the heat exchanger 14a, and detects the volume flow rate of the water flowing into the heat exchanger 14a.

A description will be given here of the case where, as illustrated in FIG. 1, one indoor unit and one hot water supply unit are connected to one heat source unit, nevertheless, the following description holds true for the case where more than one indoor unit and more than one hot water supply unit are connected to one heat source unit.

Further, the refrigerant used in the heat pump apparatus 100 is not particularly limited. Examples of the refrigerant used in the heat pump apparatus 100 may include HFC refrigerants such as R410A, R407C, R404A, and R32, HCFC refrigerants such as R22 and R134a, and natural refrigerants such as hydrocarbon and helium.

Figure 2:
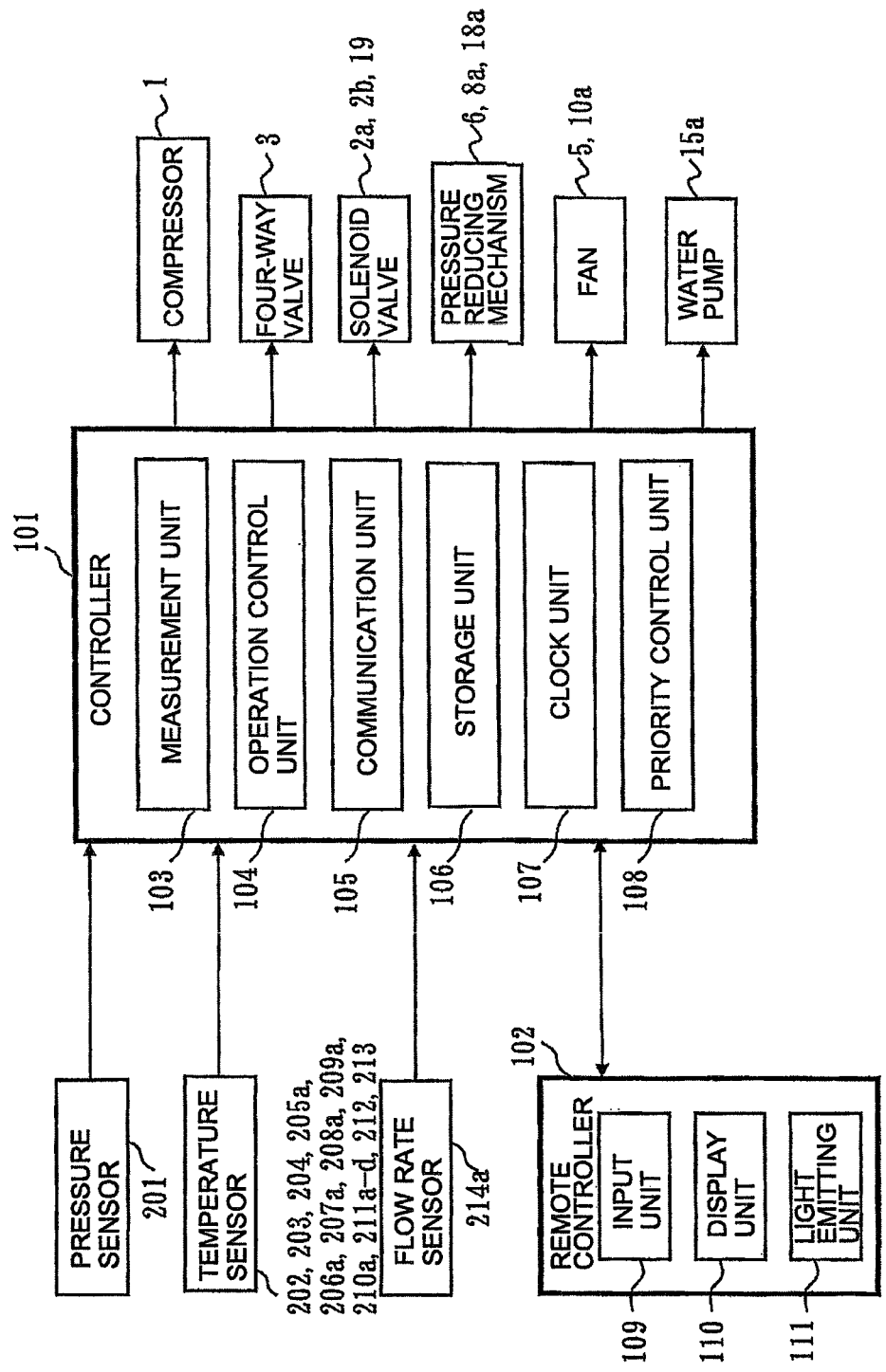
FIG. 2 is a block diagram illustrating the configuration of a controller 101 and a remote controller 102 according to Embodiment 1.

FIG. 2 is a block diagram illustrating the configuration of a controller 101 and a remote controller 102 according to Embodiment 1. In FIG. 2, the connection configuration of sensors and devices (actuators) connected to the controller 101, as well as the controller 101 and the remote controller 102 connected to the controller 101, is also illustrated.

The heat pump apparatus 100 includes the controller 101 that controls individual devices such as the compressor 1. The controller 101 includes a measurement unit 103, an operation control unit 104, a communication unit 105, a storage unit 106, a clock unit 107, and a priority control unit 108.

The measurement unit 103 acquires the respective amounts detected by various sensors such as temperature sensors, pressure sensors, and flow rate sensors. The measurement unit 103 is also capable of measuring the amount of power consumption and the operating duration of the heat pump apparatus 100. The operation control unit 104 controls the compressor 1, the solenoid valves 2a and 2b, the four-way valve 3, the fan 5, the pressure reducing mechanism 6, the pressure reducing mechanism 8a, the pressure reducing mechanism 18a, the fan 10a, the water pump 15a, and the solenoid valve 19 on the basis of the information acquired by the measurement unit 103. The communication unit 105 receives communication data information from communication means such as telephone lines, LAN lines, or radio communications, and inputs and outputs information to and from the remote controller 102. The storage unit 106 stores a predetermined constant, a set value transmitted from the remote controller 102, the operating duration of the heat pump apparatus 100, the amount of power consumption, and so forth. The content stored in the storage unit 106 can be referred to or updated, if necessary. The clock unit 107 outputs the current time. The priority control unit 108 controls the settings of a waste heat recovery priority mode described below.

The heat pump apparatus 100 further includes the remote controller 102, which is a user interface device (input device, display device) for inputting and outputting information between the controller 101 and the user. The remote controller 102 includes an input unit 109, a display unit 110, and a light emitting unit 111.

The input unit 109 receives operation ON/OFF, which has been made by the user, various operation modes that have been selected, and set values such as an indoor setting temperature and a boiling temperature. The display unit 110 displays processing results of a microcomputer of the controller 101, such as the current amount of accumulated heat. The light emitting unit 111 emits light from the display of the remote controller or from the periphery of the apparatus in accordance with the processing results of the microcomputer.

The heat pump apparatus 100 may further include an output unit for outputting alert sounds and the like.

Each of the measurement unit 103, the operation control unit 104, the communication unit 105, the clock unit 107, and the priority control unit 108 is formed of, for example, a microcomputer. The storage unit 106 is formed of, for example, a semiconductor memory. The input unit 109 includes, for example, buttons and a touch panel. The display unit 110 is formed of, for example, a liquid crystal screen. The light emitting unit 111 is formed of, for example, an LED (Light Emitting Diode).

The controller 101 is located in the heat source unit 301. This is an example, and the place where the controller 101 is to be located is not limited.

Next, the operation of the heat pump apparatus 100 according to Embodiment 1 will be described.

The heat pump apparatus 100 controls the individual devices incorporated in the heat source unit 301, the indoor unit 302, and the hot water supply unit 303 in accordance with an air conditioning request issued to the indoor unit 302a and a hot water supply request issued to the hot water supply unit 303. Then, the heat pump apparatus 100 executes five operation modes, namely, a cooling operation mode A, a heating operation mode B, a hot water supply operation mode C, a simultaneous heating/hot water supply operation mode D, and a simultaneous cooling/hot water supply operation mode E.

The refrigerant flow through the heat pump apparatus 100 and a control method for the individual devices in each operation mode will be described.

<Cooling Operation Mode A>

Figure 3:
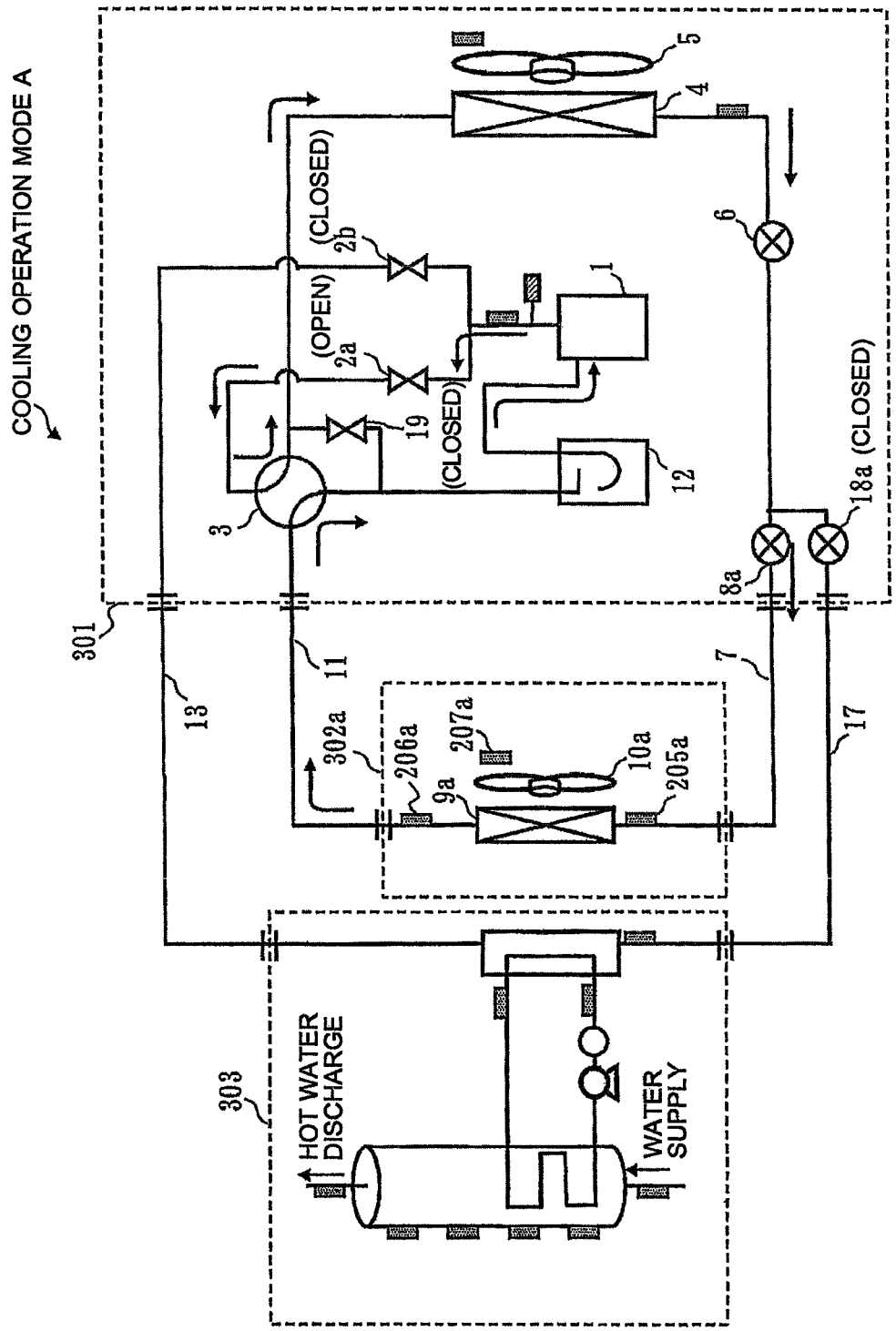
FIG. 3 is a diagram illustrating the flow of a refrigerant and a control method for individual devices in a cooling operation mode A.

FIG. 3 is a diagram illustrating the flow of the refrigerant and a control method for the individual devices in the cooling operation mode A.

In the cooling operation mode A, the four-way valve 3 is set to allow the flow indicated by the solid line in FIG. 1. The solenoid valve 2a is set to open position, the solenoid valve 2b to closed position, and the solenoid valve 19 to closed position. The pressure reducing mechanism 18a is set to the minimum opening degree (fully closed).

The high-temperature, high-pressure gaseous refrigerant discharged from the compressor 1 passes through the solenoid valve 2a and the four-way valve 3, and flows into the heat exchanger 4. The refrigerant flowing into the heat exchanger 4 undergoes heat exchange with the outdoor air supplied by the fan 5 to become a high-pressure liquid refrigerant. The high-pressure liquid refrigerant flows out of the heat exchanger 4, passes through the pressure reducing mechanism 6 controlled to the maximum opening degree (fully open), and undergoes pressure reduction in the pressure reducing mechanism 8a to become a low-pressure two-phase refrigerant. The pressure reducing mechanism 8a is controlled to an opening degree at which the degree of superheat of the heat exchanger 9a has a certain value. The degree of superheat of the heat exchanger 9a is determined by subtracting the temperature obtained by the indoor-side liquid temperature sensor 205a from the temperature obtained by the indoor-side gas temperature sensor 206a.

The low-pressure two-phase refrigerant flows out of the heat source unit 301, and flows into the indoor unit 302a through the pipe 7. The refrigerant flowing into the indoor unit 302a flows into the indoor heat exchanger 9a, and cools the indoor air supplied by the indoor fan 10a to become a low-pressure gaseous refrigerant. The low-pressure gaseous refrigerant flows out of the indoor unit 302a, and flows into the heat source unit 301 through the pipe 11. The refrigerant flowing into the heat source unit 301 flows into the accumulator 12 through the four-way valve 3, and is then again sucked into the compressor 1. The compressor 1 is controlled so that the difference between the temperature obtained by the temperature sensor 207a in the indoor unit 302a and the indoor setting temperature is small.

<Heating Operation Mode B>

Figure 4:
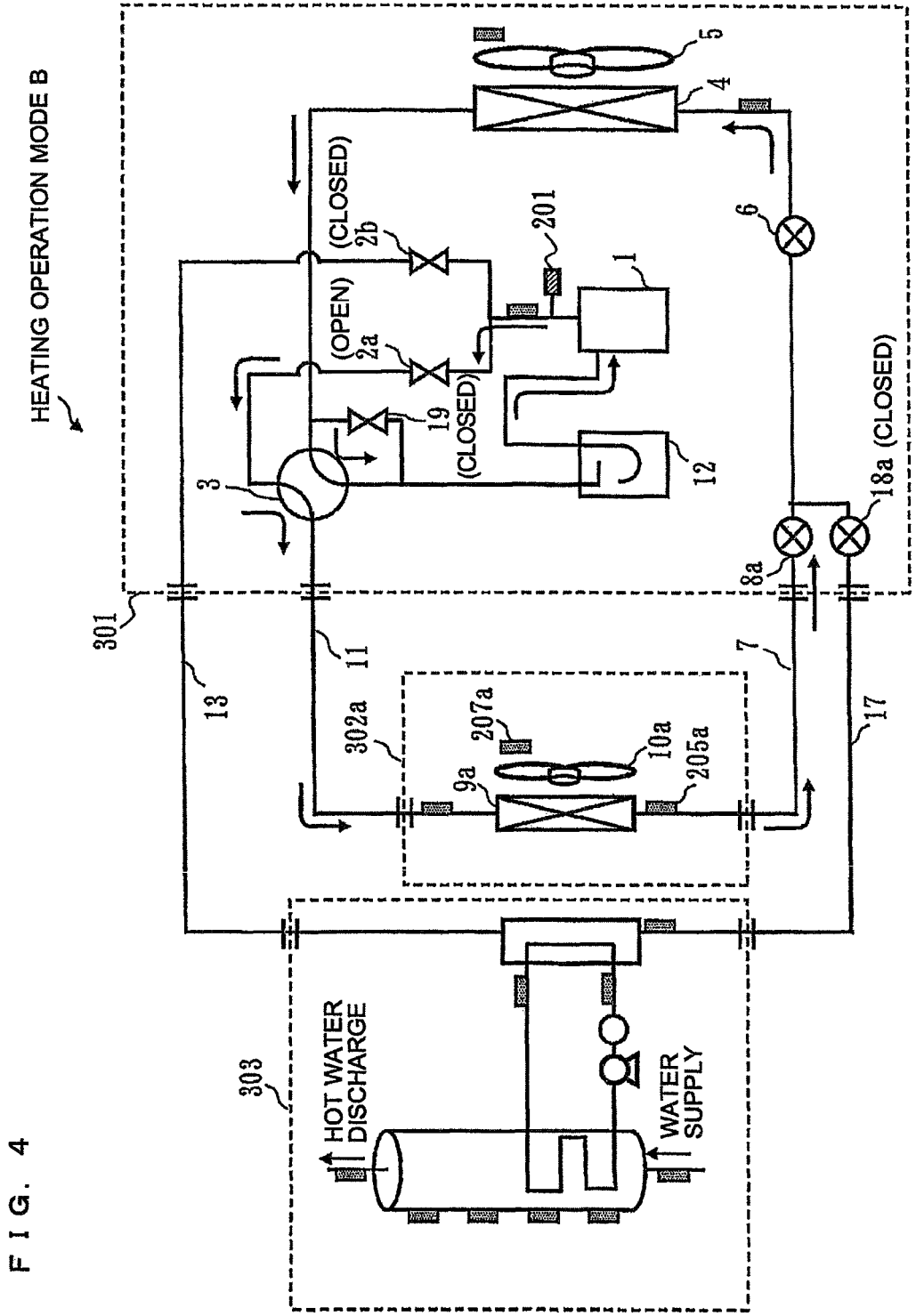
FIG. 4 is a diagram illustrating the flow of a refrigerant and a control method for individual devices in a heating operation mode B.

FIG. 4 is a diagram illustrating the flow of the refrigerant and a control method for the individual devices in the heating operation mode B.

In the heating operation mode B, the four-way valve 3 is set to allow the flow indicated by the broken line in FIG. 1. The solenoid valve 2a is set to open position, the solenoid valve 2b to closed position, and the solenoid valve 19 to closed position. The pressure reducing mechanism 18a is set to be fully closed.

The high-temperature, high-pressure gaseous refrigerant discharged from the compressor 1 passes through the solenoid valve 2a and the four-way valve 3, and flows out of the heat source unit 301. The refrigerant flowing out of the heat source unit 301 flows into the indoor unit 302a through the pipe 11. The refrigerant flowing into the indoor unit 302a flows into the heat exchanger 9a, heats the indoor air supplied by the fan 10a to become a high-pressure liquid refrigerant, and flows out of the heat exchanger 9a. The high-pressure liquid refrigerant flows out of the indoor unit 302a, and flows into the heat source unit 301 through the pipe 7. The refrigerant flowing into the heat source unit 301 is subjected to pressure reduction by the pressure reducing mechanism 8a to become a low-pressure two-phase refrigerant. The pressure reducing mechanism 8a is controlled to an opening degree at which the degree of subcooling of the heat exchanger 9a has a certain value. The degree of subcooling of the heat exchanger 9a is determined by subtracting the temperature obtained by the indoor-side liquid temperature sensor 205a from the saturation temperature at the pressure obtained by the pressure sensor 201.

The low-pressure two-phase refrigerant passes through the pressure reducing mechanism 6 controlled to be fully open, and flows into the heat exchanger 4. The refrigerant flowing into the heat exchanger 4 undergoes heat exchange with the outdoor air supplied by the fan 5 to become a low-pressure gaseous refrigerant. The low-pressure gaseous refrigerant flows out of the heat exchanger 4, flows into the accumulator 12 through the four-way valve 3, and is then again sucked into the compressor 1. The compressor 1 is controlled so that the difference between the temperature obtained by the temperature sensor 207a in the indoor unit 302a and the indoor setting temperature is small.

<Hot Water Supply Operation Mode C>

Figure 5:
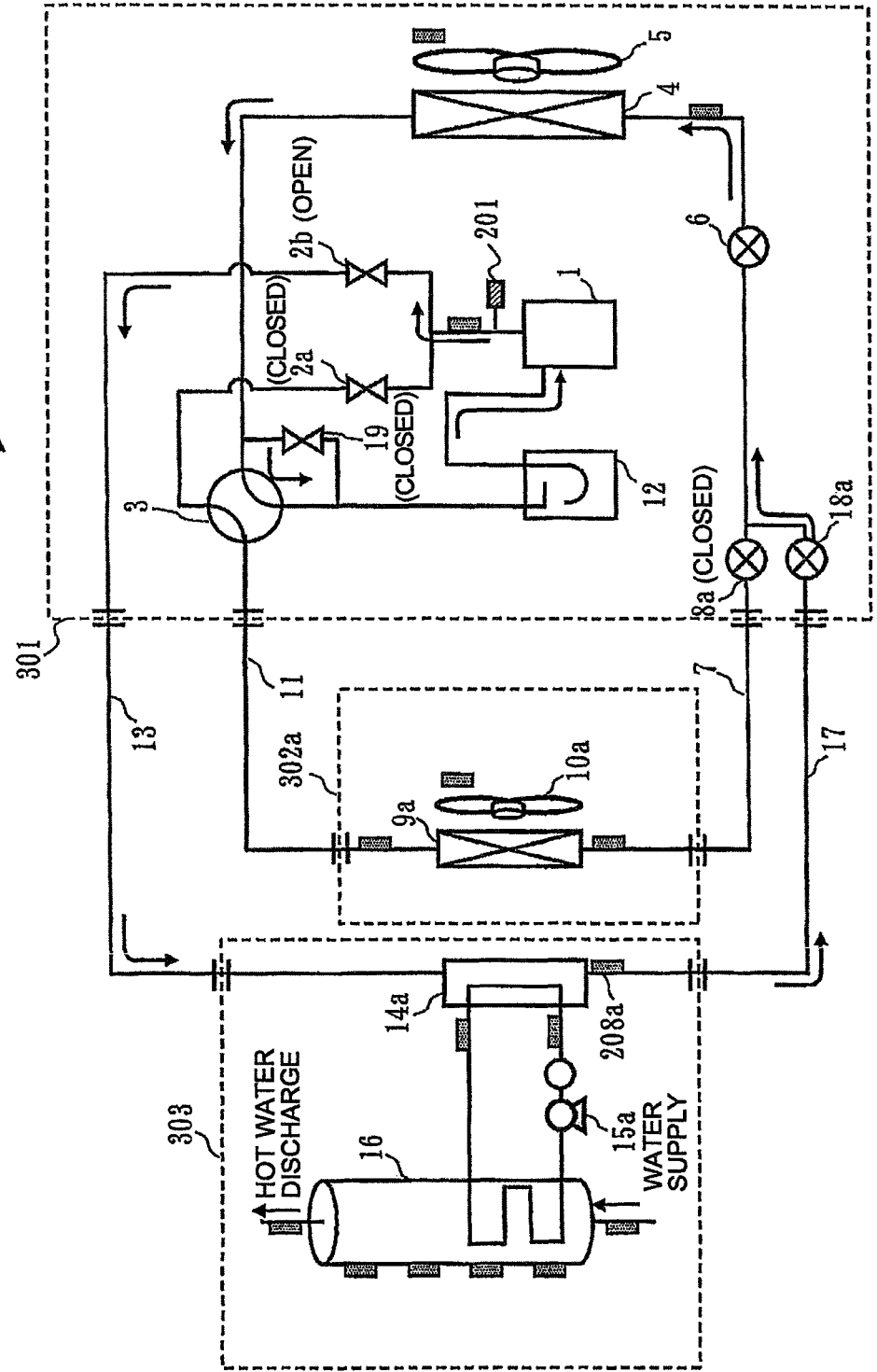
FIG. 5 is a diagram illustrating the flow of a refrigerant and a control method for individual devices in a hot water supply operation mode C.

FIG. 5 is a diagram illustrating the flow of the refrigerant and a control method for the individual devices in the hot water supply operation mode C.

In the hot water supply operation mode C, the four-way valve 3 is set to allow the flow indicated by the broken line in FIG. 1. The four-way valve 3 may be set so as to connect the accumulator 12 and the heat exchanger 4, and need not connect the heat exchanger 9a and the solenoid valve 2a. The solenoid valve 2a is set to closed position, the solenoid valve 2b to open position, and the solenoid valve 19 to closed position. The pressure reducing mechanism 8a is set to be fully closed.

The high-temperature, high-pressure gaseous refrigerant discharged from the compressor 1 flows out of the heat source unit 301 via the solenoid valve 2b, and flows into the hot water supply unit 303 through the pipe 13. The refrigerant flowing into the hot water supply unit 303 flows into the heat exchanger 14a, and heats the water supplied by the water pump 15a to become a high-pressure liquid refrigerant. The high-pressure liquid refrigerant flows out of the heat exchanger 14a, flows out of the hot water supply unit 303, and flows into the heat source unit 301 through the pipe 17. The refrigerant flowing into the heat source unit 301 is subjected to pressure reduction by the pressure reducing mechanism 18a to become a low-pressure two-phase refrigerant. The pressure reducing mechanism 18a is controlled to an opening degree at which the degree of subcooling on the liquid side of the heat exchanger 14a has a certain value. The degree of subcooling on the liquid side of the heat exchanger 14a is determined by subtracting the temperature obtained by the temperature sensor 208a from the saturation temperature at the pressure obtained by the pressure sensor 201.

The low-pressure two-phase refrigerant passes through the pressure reducing mechanism 6 controlled to be fully open, and flows into the heat exchanger 4. The refrigerant flowing into the heat exchanger 4 cools the outdoor air supplied by the fan 5 to become a low-pressure gaseous refrigerant. The low-pressure gaseous refrigerant flows out of the heat exchanger 4, flows into the accumulator 12 through the four-way valve 3, and is then again sucked into the compressor 1. The compressor 1 is controlled at, for example, the maximum frequency, aiming at an operation of maximizing the hot water supply capacity to boil hot water in a short time period.

<Simultaneous Heating/Hot Water Supply Operation Mode D>

Figure 6:
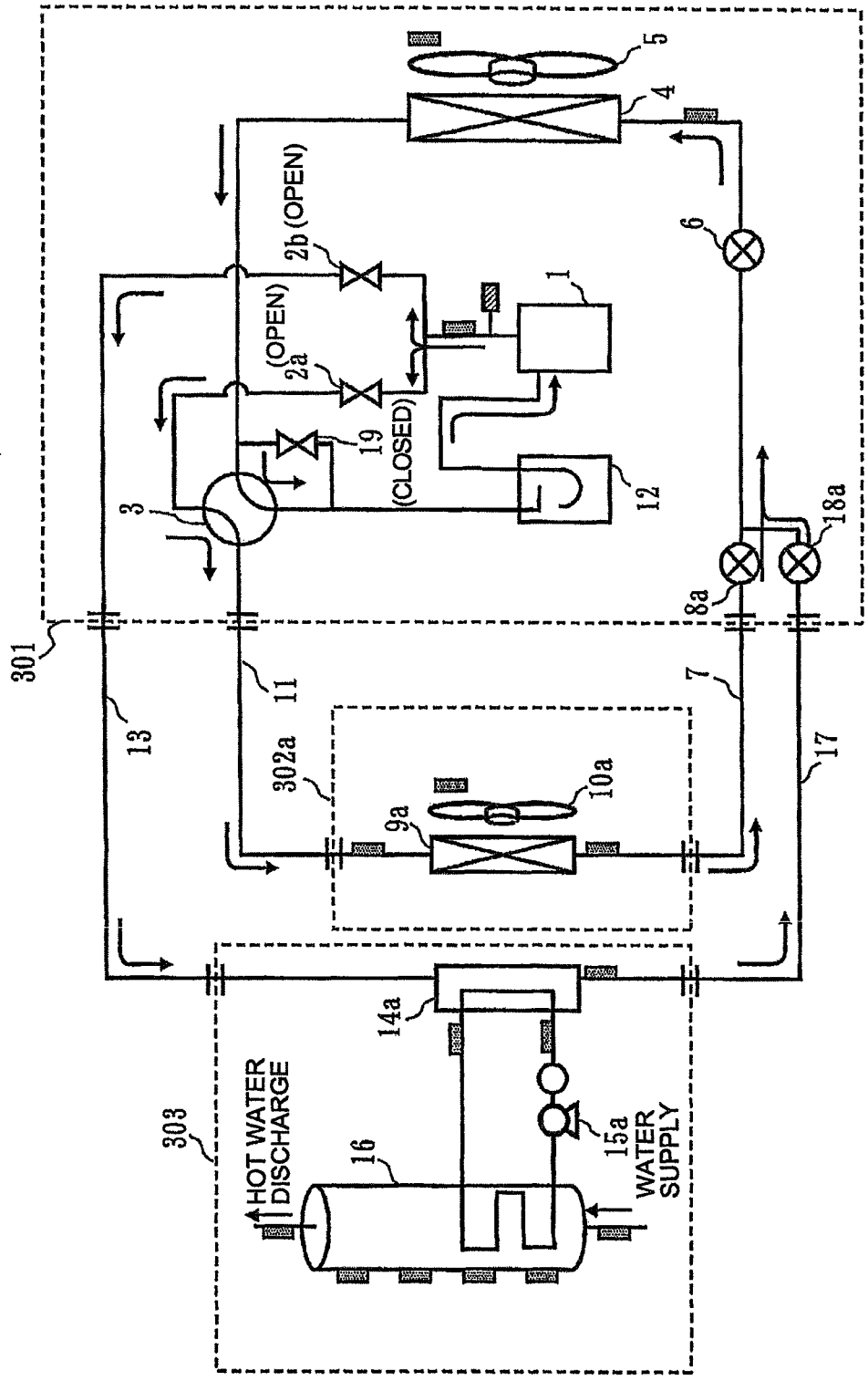
FIG. 6 is a diagram illustrating the flow of a refrigerant and a control method for individual devices in a simultaneous heating/hot water supply operation mode D.

FIG. 6 is a diagram illustrating the flow of the refrigerant and a control method for the individual devices in the simultaneous heating/hot water supply operation mode D.

In the simultaneous heating/hot water supply operation mode D, the four-way valve 3 is set to allow the flow indicated by the broken line in FIG. 1. The solenoid valve 2a is set to open position, the solenoid valve 2b to open position, and the solenoid valve 19 to closed position.

The high-temperature, high-pressure gaseous refrigerant discharged from the compressor 1 is distributed so as to flow through the solenoid valve 2a and the solenoid valve 2b.

The refrigerant flowing into the solenoid valve 2a flows out of the heat source unit 301 after passing through the four-way valve 3, and flows into the indoor unit 302a through the pipe 11. The refrigerant flowing into the indoor unit 302a flows into the heat exchanger 9a, heats the indoor air supplied by the fan 10a to become a high-pressure liquid refrigerant, and flows out of the heat exchanger 9a. The refrigerant flowing out of the heat exchanger 9a flows out of the indoor unit 302a, and flows into the heat source unit 301 through the pipe 7. The refrigerant flowing into the heat source unit 301 is subjected to pressure reduction by the pressure reducing mechanism 8a to become a low-pressure two-phase refrigerant. Here, the pressure reducing mechanism 8a is controlled to an opening degree at which the degree of subcooling of the heat exchanger 9a has a certain value.

On the other hand, the refrigerant flowing into the solenoid valve 2b flows out of the heat source unit 301, and flows into the hot water supply unit 303 through the pipe 13. The refrigerant flowing into the hot water supply unit 303 flows into the heat exchanger 14a, heats the water supplied by the water pump 15a to become a high-pressure liquid refrigerant, and flows out of the heat exchanger 14a. The high-pressure liquid refrigerant flows out of the hot water supply unit 303, and flows into the heat source unit 301 through the pipe 17. The refrigerant flowing into the heat source unit 301 is subjected to pressure reduction by the pressure reducing mechanism 18a to become a low-pressure two-phase refrigerant. Here, the pressure reducing mechanism 18a is controlled to an opening degree at which the degree of subcooling on the liquid side of the heat exchanger 14a has a certain value.

The refrigerant subjected to pressure reduction by the pressure reducing mechanism 8a and the refrigerant subjected to pressure reduction by the pressure reducing mechanism 18a merge. The merging flow of refrigerant passes through the pressure reducing mechanism 6 controlled to a fully-open opening degree, and flows into the heat exchanger 4. The refrigerant flowing into the heat exchanger 4 cools the outdoor air supplied by the fan 5 to become a low-pressure gaseous refrigerant. The refrigerant flowing out of the heat exchanger 4 flows into the accumulator 12 through the four-way valve 3, and is then again sucked into the compressor 1. The compressor 1 is controlled at, for example, the maximum frequency in order to complete hot water supply in a short time period and perform the heating operation of the indoor unit 302a.

<Simultaneous Cooling/Hot Water Supply Operation Mode E>

Figure 7:
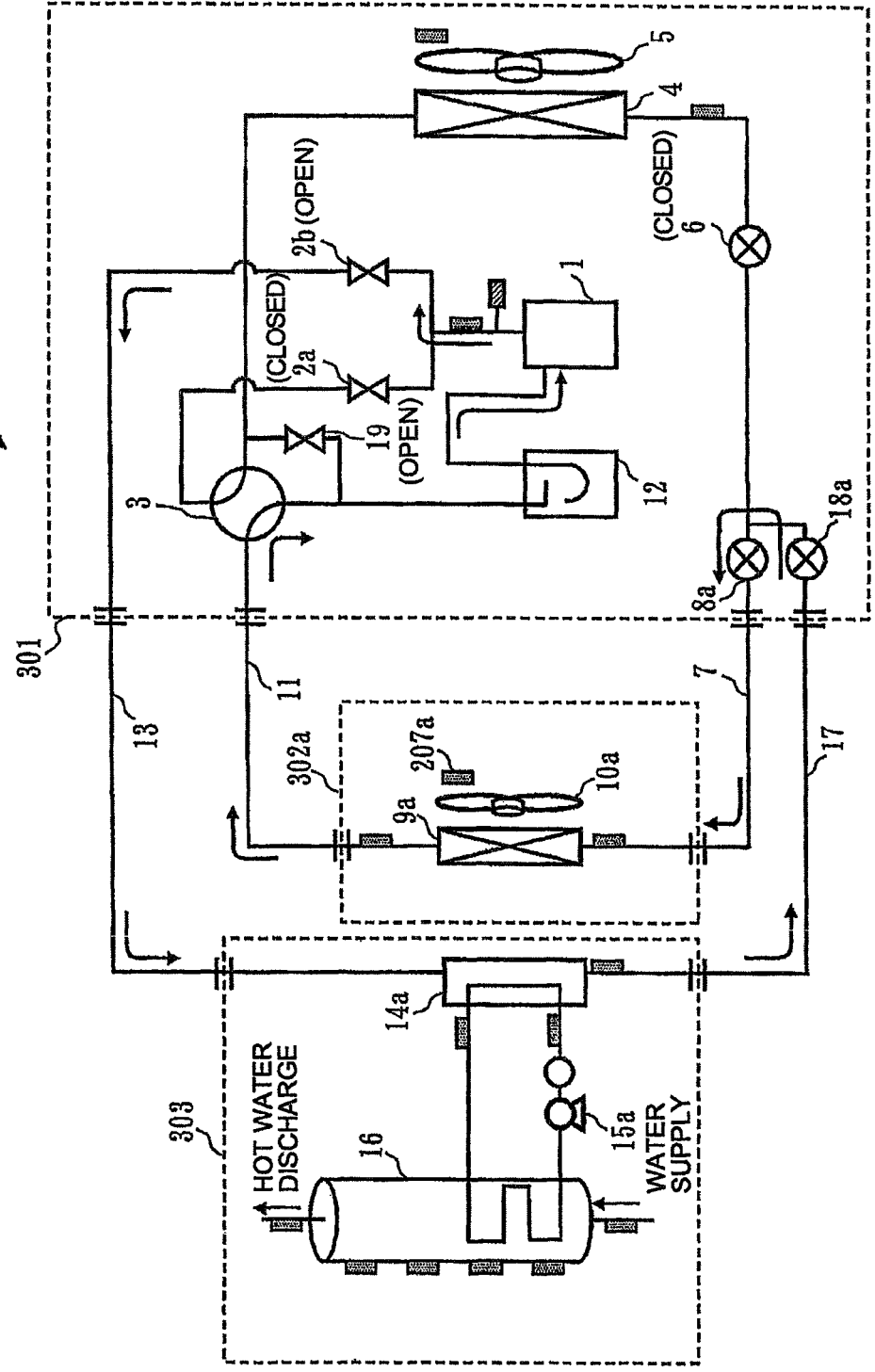
FIG. 7 is a diagram illustrating the flow of a refrigerant and a control method for individual devices in a simultaneous cooling/hot water supply operation mode E.

FIG. 7 is a diagram illustrating the flow of the refrigerant and a control method for the individual devices in the simultaneous cooling/hot water supply operation mode E.

In the simultaneous cooling/hot water supply operation mode E, the four-way valve 3 is set to allow the flow indicated by the solid line in FIG. 1. The four-way valve 3 may be set so as to connect the accumulator 12 and the heat exchanger 9a, and need not connect the solenoid valve 2a and the heat exchanger 4. The solenoid valve 2a is set to closed position, the solenoid valve 2b to open position, and the solenoid valve 19 to open position. The pressure reducing mechanism 6 is set to the minimum opening degree (fully closed).

The high-temperature, high-pressure gaseous refrigerant discharged from the compressor 1 flows into the solenoid valve 2b, flows out of the heat source unit 301, and flows into the hot water supply unit 303 through the pipe 13. The refrigerant flowing into the hot water supply unit 303 flows into the heat exchanger 14a, heats the water supplied by the water pump 15a to become a high-pressure liquid refrigerant, and flows out of the heat exchanger 14a. The high-pressure liquid refrigerant flows out of the hot water supply unit 303, and flows into the heat source unit 301 through the pipe 17. The refrigerant flowing into the heat source unit 301 passes through the pressure reducing mechanism 18a controlled to be fully open, and undergoes pressure reduction in the pressure reducing mechanism 8a to become a low-pressure two-phase refrigerant. The pressure reducing mechanism 8a is controlled so that the degree of subcooling of the heat exchanger 14a has a certain value. The low-pressure two-phase refrigerant flows out of the heat source unit 301, and flows into the indoor unit 302a through the pipe 7.

The refrigerant flowing into the indoor unit 302a flows into the heat exchanger 9a, and cools the indoor air supplied by the fan 10a to become a low-pressure gaseous refrigerant. The low-pressure gaseous refrigerant flows out of the indoor unit 302a, and flows into the heat source unit 301 through the pipe 11. The refrigerant flowing into the heat source unit 301 flows into the accumulator 12 through the four-way valve 3, and is then again sucked into the compressor 1.

The control method for the compressor 1 is determined in accordance with whether cooling priority where the compressor 1 is controlled in accordance with the cooling load or hot water supply priority where the compressor 1 is controlled in accordance with the hot water supply load is to be used. In principle, the operation is carried out with cooling priority. However, if the hot water supply operation is continuously performed for a certain time period or longer, that is, if the hot water supply operation mode C and the simultaneous cooling/hot water supply operation mode E last for an operating duration of a certain time period or longer (for example, two hours or longer), the operation is carried out with hot water supply priority.

In the case of cooling priority, the compressor 1 is controlled so that the difference between the temperature obtained by the temperature sensor 207a in the indoor unit 302a and the indoor setting temperature is small. In the case of hot water supply priority, the compressor 1 is controlled at, for example, the maximum frequency, aiming at an operation of maximizing the hot water supply capacity to boil hot water in a short time period.

In the simultaneous cooling/hot water supply operation mode E, since the pressure reducing mechanism 6 is controlled to a fully-closed opening degree, no refrigerant flows through the heat exchanger 4. Hence, the amount of heat exchange performed by the heat exchanger 4 is zero. That is, the simultaneous cooling/hot water supply operation mode E provides a complete waste heat recovery operation in which all the waste heat of the indoor unit 302a is recovered by the hot water supply unit 303.

Furthermore, the solenoid valve 2a is set to closed position and the solenoid valve 19 to open position, thereby connecting the four-way valve 3 side of the heat exchanger 4 to the suction side of the compressor 1. This allows the heat exchanger 4 to work in a low-pressure atmosphere, and can prevent accumulation of the refrigerant in the heat exchanger 4. If the solenoid valve 2a and the solenoid valve 19 are not present, the heat exchanger 4 works in a high-pressure atmosphere, and the refrigerant is condensed and liquefied by the outside air, resulting in the accumulation of the refrigerant.

Thus, there arises a need to cause the refrigerant to flow through the heat exchanger 4 to suppress the accumulation of the refrigerant. On the other hand, as described above, if the solenoid valve 2a and the solenoid valve 19 are present, the heat exchanger 4 can be placed in a low-pressure atmosphere, and the refrigerant is not liquefied by the outside air. Thus, there is no need to cause the refrigerant to flow through the heat exchanger 4, and the refrigerant flow through the heat exchanger 4 can be zero. Therefore, the simultaneous cooling/hot water supply operation mode E enables all the refrigerant to flow into the indoor unit 302a, and provides a complete waste heat recovery operation. As a result, operating efficiency is improved.

Here, in principle, the heat pump apparatus 100 performs the simultaneous cooling/hot water supply operation mode E to recover waste heat in a case where the cooling load, which is the required load of the indoor unit 302a, and the hot water supply load, which is the required load of the hot water supply unit 303, are concurrently present.

Specifically, if cooling is turned on (the cooling load is present) and the temperature of the water in the hot water storage tank 16 is reduced and it is determined that there is a shortage of hot water (the hot water supply load is present), the simultaneous cooling/hot water supply operation mode E is used. Then, if it is determined that the temperature of the water in the hot water storage tank 16 has reached a first target boiling temperature (first heating temperature) after a certain duration of operation, the operation mode is changed to the cooling operation mode A to terminate the hot water supply operation. Meanwhile, if cooling is turned off and the cooling load becomes absent, the operation mode is changed to the hot water supply operation mode C to complete the cooling operation.

The first target boiling temperature is a normal target boiling temperature set by the user using the input unit 109 of the remote controller 102. Normal boiling means boiling in a case where the hot water supply load (the required load) of the hot water supply unit 303 is present.

A method in which the operation control unit 104 determines whether or not the temperature of the hot water in the hot water storage tank 16 has reached the first target boiling temperature is as follows. First, the operation control unit 104 identifies the state of the accumulation of hot water on the basis of the water temperature sensors 211a to 211d disposed in the hot water storage tank 16. Then, the operation control unit 104 determines whether or not the temperature difference between the temperature detected by the water temperature sensor 211d disposed in the lowermost of the hot water storage tank 16 and the target boiling temperature is less than or equal to a certain value (for example, less than or equal to 5 degrees C.). At the time when the temperature difference is equal to or within the certain value, the operation control unit 104 determines that the hot water of the first target boiling temperature has built up in the hot water storage tank 16.

However, since not using the simultaneous cooling/hot water supply operation mode E unless the cooling load and the hot water supply load are concurrently generated is equivalent to not recovering waste heat unless the cooling load and the hot water supply load are concurrently generated, the energy saving capacity of the system may not be sufficiently exercised.

Accordingly, the heat pump apparatus 100 has a waste heat recovery priority mode to allow active recovery of waste heat, thereby sufficiently exercising the energy saving capacity of the system.

Figure 8:
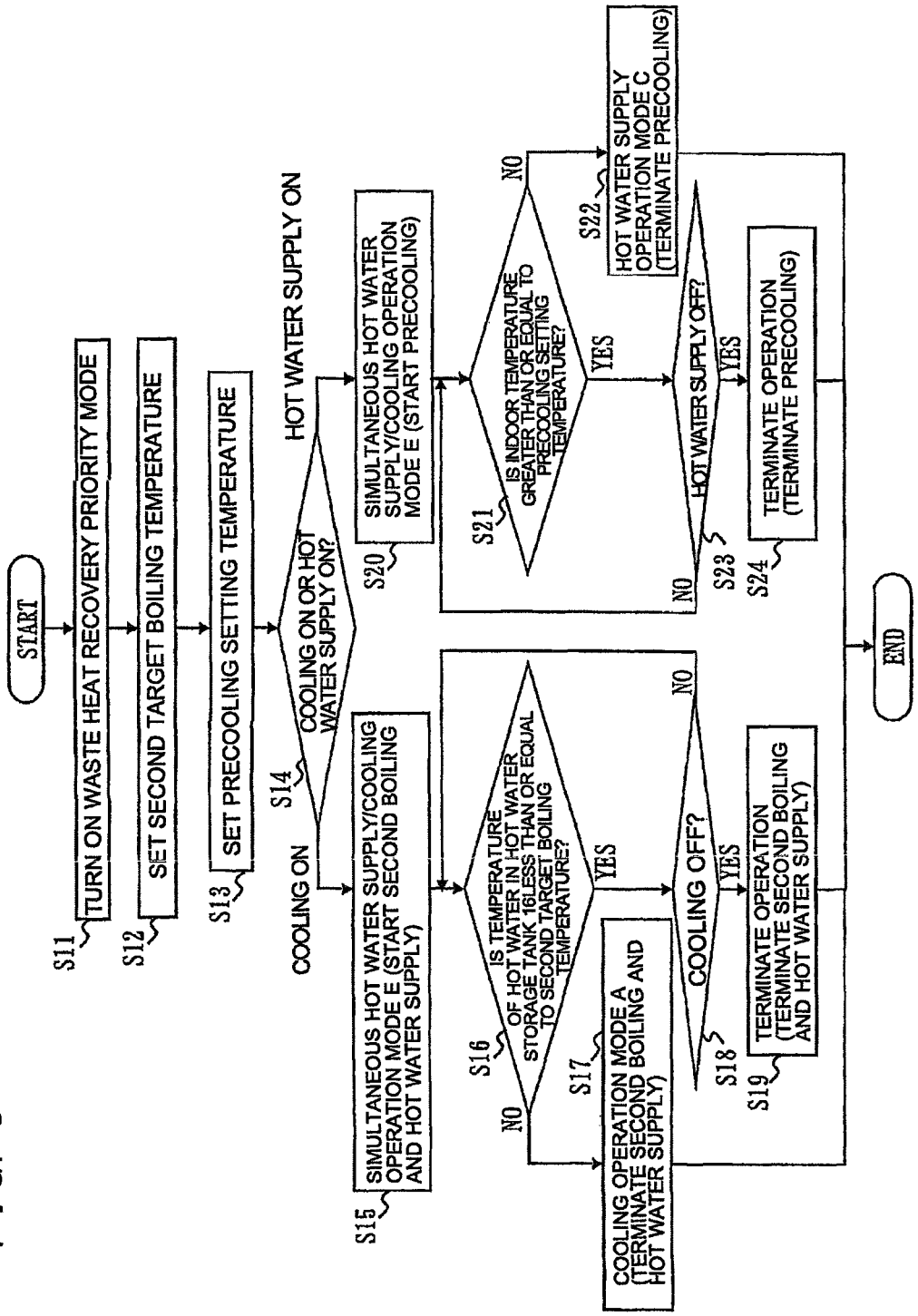
FIG. 8 is a flowchart illustrating the operation process of the heat pump apparatus 100 in a waste heat recovery priority mode.

FIG. 8 is a flowchart illustrating the operation process of the heat pump apparatus 100 in the waste heat recovery priority mode.

First, in S11, the priority control unit 108 sets the waste heat recovery priority mode to ON. Here, the priority control unit 108 prompts the user to select and input the waste heat recovery priority mode through the input unit 109 of the remote controller 102. If the waste heat recovery priority mode is OFF, as described above, the simultaneous cooling/hot water supply operation mode E is executed only when the cooling load and the hot water supply load are concurrently generated.

Figure 9:
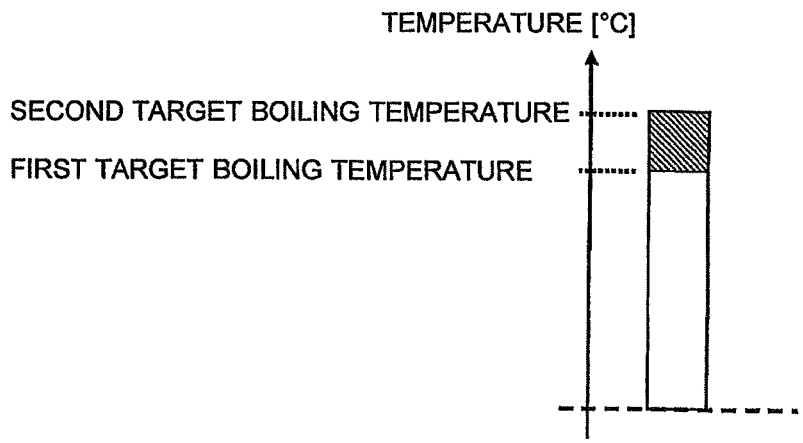
FIG. 9 is an explanatory diagram of a second target boiling temperature.

Then, in S12, as illustrated in FIG. 9, the priority control unit 108 prompts the user to input a second target boiling temperature (second heating temperature) that represents a temperature higher than the first target boiling temperature by a certain value or more, through the input unit 109 of the remote controller 102. Further, in S13, the priority control unit 108 prompts the user to input a precooling setting temperature (cooling temperature) through the input unit 109 of the remote controller 102.

Then, in S14, the priority control unit 108 waits until cooling is turned on or hot water supply is turned on.

If cooling is turned on in S14, the priority control unit 108 advances the process to S15. In S15, the priority control unit 108 executes the simultaneous cooling/hot water supply operation mode E and starts second boiling and hot water supply. The second boiling and hot water supply is a waste heat recovery operation performed in a case where the hot water supply load (the required load) of the hot water supply unit 303 is absent.

Then, in S16, the priority control unit 108 determines whether or not the temperature of the hot water in the hot water storage tank 16 is less than or equal to the second target boiling temperature. If the temperature is higher than the second target boiling temperature (NO in S16), the priority control unit 108 advances the process to S17. In S17, the priority control unit 108 terminates the second boiling and hot water supply, and executes the cooling operation mode A. On the other hand, if the temperature is less than or equal to the second target boiling temperature (YES in S16), the priority control unit 108 advances the process to S18, and determines whether or not cooling is OFF. If cooling is ON (NO in S18), the priority control unit 108 returns the process to S16. On the contrary, if cooling is OFF, that is, if the user stops the cooling operation and the cooling load is absent (YES in S18), the priority control unit 108 advances the process to S19. In S19, the priority control unit 108 terminates the operation.

That is, when the waste heat recovery priority mode is selected, even though the temperature of the hot water in the hot water storage tank 16 has reached the first target boiling temperature, the simultaneous cooling/hot water supply operation mode E is executed if the temperature has not reached the second target boiling temperature which is higher than the first target boiling temperature.

Such second boiling and hot water supply makes it possible to increase the duration of the hot water supply operation with waste heat recovery. Since the duration of the hot water supply operation with waste heat recovery can be increased, the operating duration of the hot water supply operation mode C can be reduced, and therefore the energy saving capacity is improved. In the waste heat recovery priority mode, in a case where the heat exchanger 9a serves as an evaporator in the cooling operation, making the heat exchanger 14a serve as a condenser as much as possible suppresses the heat exchanger 4 from serving as a condenser and performing an operation that produces waste heat.

On the other hand, if hot water supply is turned on in S14, the priority control unit 108 advances the process to S20. In S20, the priority control unit 108 executes the simultaneous cooling/hot water supply operation mode E and starts precooling. Precooling is a waste heat recovery operation performed in a case where the cooling load (the required load) of the indoor unit 302a is absent.

Then, in S21, the priority control unit 108 determines whether or not the indoor temperature of the indoor unit 302a is greater than or equal to the precooling setting temperature. If the temperature is lower than the precooling setting temperature (NO in S21), the priority control unit 108 advances the process to S22. In S22, precooling is terminated and the hot water supply operation mode C is executed. On the other hand, if the temperature is greater than or equal to the precooling setting temperature (YES in S21), the priority control unit 108 advances the process to S23, and determines whether or not hot water supply is OFF. If hot water supply is ON (NO in S23), the priority control unit 108 returns the process to S21. On the other hand, the hot water supply is OFF, that is, if the temperature of the hot water in the hot water storage tank 16 has reached the first target boiling temperature and the hot water supply load becomes absent (YES in S23), the priority control unit 108 advances the process to S24. Note that it may be determined that hot water supply is OFF when the temperature of the hot water in the hot water storage tank 16 has reached the second target boiling temperature. In S24, the priority control unit 108 terminates the operation.

That is, when the waste heat recovery priority mode is selected, even though cooling is not ON, the simultaneous cooling/hot water supply operation mode E is executed if the indoor temperature is greater than or equal to the precooling setting temperature.

Such precooling makes it possible to increase the duration of the cooling operation with waste heat recovery. Since the duration of the cooling operation with waste heat recovery can be increased, the operating duration of the cooling operation mode A can be reduced, and therefore the energy saving capacity is improved. The precooling is an operation that is particularly effective in a space into which little heat enters, such as a superinsulated house. In the waste heat recovery priority mode, in a case where the heat exchanger 14a serves as a condenser in the hot water supply operation, making the heat exchanger 9a serve as an evaporator as much as possible suppresses the heat exchanger 4 from serving as an evaporator and performing an operation that produces waste heat.

The method for setting the second target boiling temperature in S12 may include, for example, prompting the user to input a through the remote controller 102, where the second target boiling temperature is higher than the first target boiling temperature by a degrees C. Alternatively, the maximum boiling temperature of the system may be set as the second target boiling temperature. If the second target boiling temperature is equal to the maximum boiling temperature, waste heat recovery is preferentially executed until the amount of heat accumulated in the hot water storage tank 16 is full.

Further, in S13, the precooling setting temperature may be equal to the setting temperature that is set at the end of the previous cooling operation.

The second target boiling and hot water supply temperature and the precooling setting temperature are stored in the storage unit 106.

Further, in the independent waste heat recovery priority mode, the second boiling and hot water supply and the precooling may be permitted, or the second boiling temperature and hot water supply and the precooling may be individually set such as the permission of the second boiling and hot water supply and the non permission of the precooling. Individual setting allows the user to set the waste heat recovery priority mode so as to fit into their life style.

Figure 10:
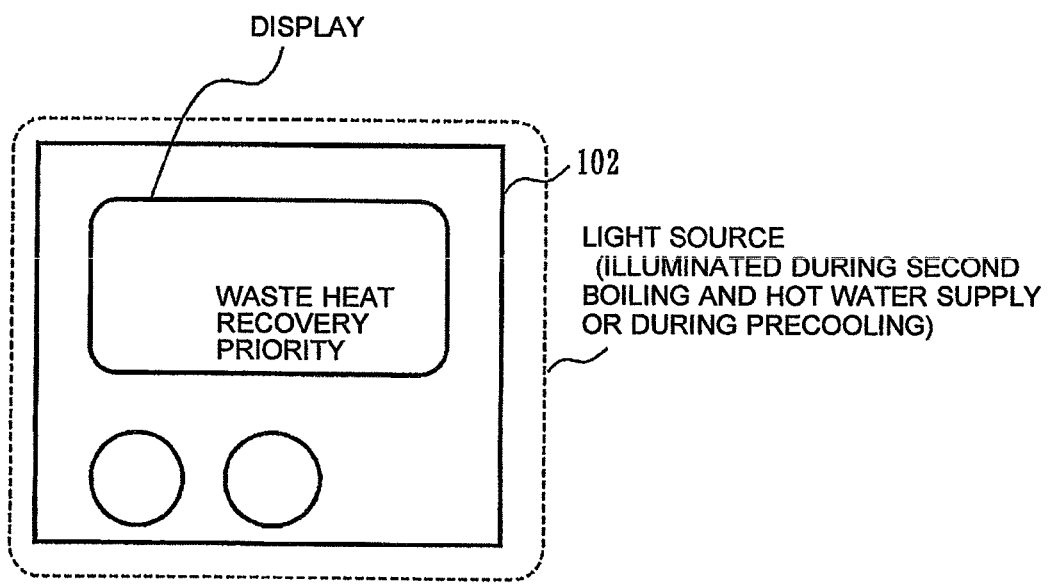
FIG. 10 is an explanatory diagram of the remote controller 102 in the waste heat recovery priority mode.

Further, as illustrated in FIG. 10, during the waste heat recovery priority mode, the display unit 110 of the remote controller 102 displays on the display a sign that indicates the waste heat recovery priority mode is in progress. Further, during the second boiling and hot water supply or the precooling, the light emitting unit 111 causes a light source to emit light such as light of red for the second boiling and hot water supply and light of blue for the precooling in order to allow the viewer to know at a glance whether the second boiling and hot water supply or the precooling is in operation once they check the remote controller. As illustrated in FIG. 10, light may be emitted by illuminating light sources (for example, LED) disposed on the periphery of the remote controller or illuminating the display. Doing so makes it possible to inform the user that the waste heat recovery priority mode is in progress.

In the foregoing description, the opportunities to execute the cooling operation mode A in which the cooling operation is performed independently is reduced as much as possible, whereas the simultaneous cooling/hot water supply operation mode E is executed many times to execute the hot water supply operation until the second target boiling temperature has been reached. The reason that the simultaneous cooling/hot water supply operation mode E is executed many times is that, whereas in the cooling operation mode A, the evaporation capacity is only utilized as a cooling capacity, in the simultaneous cooling/hot water supply operation mode E, the heat rejection capacity is utilized as a hot water supply capacity and additionally the evaporation capacity can be utilized as a cooling capacity.

However, the operating efficiency for the simultaneous cooling/hot water supply operation mode E is not always higher than that for the cooling operation mode A. An operational method for further sufficiently exercising the energy saving capacity taking this fact into account will be described with reference to FIG. 11 to FIG. 14.

Figure 11:
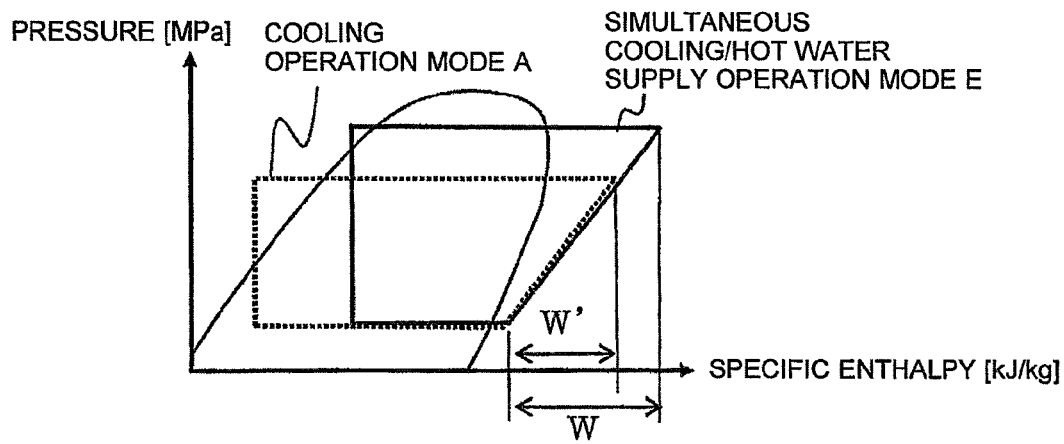
FIG. 11 is a Mollier diagram for the cooling operation mode A and the simultaneous cooling/hot water supply operation mode E.
Figure 12:
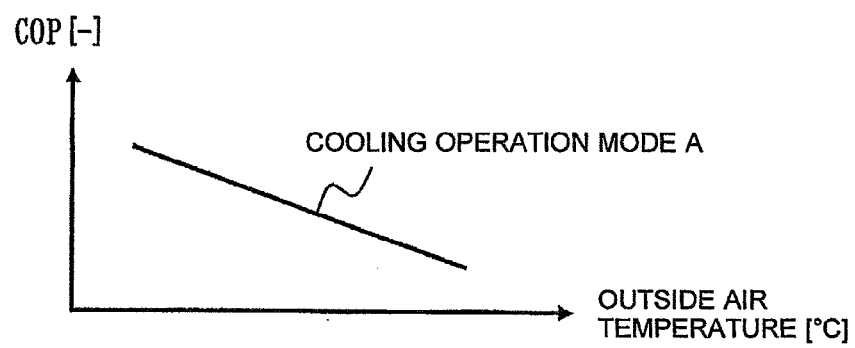
FIG. 12 is a diagram illustrating the relationship between the outside air temperature and the COP in the cooling operation mode A.
Figure 13:
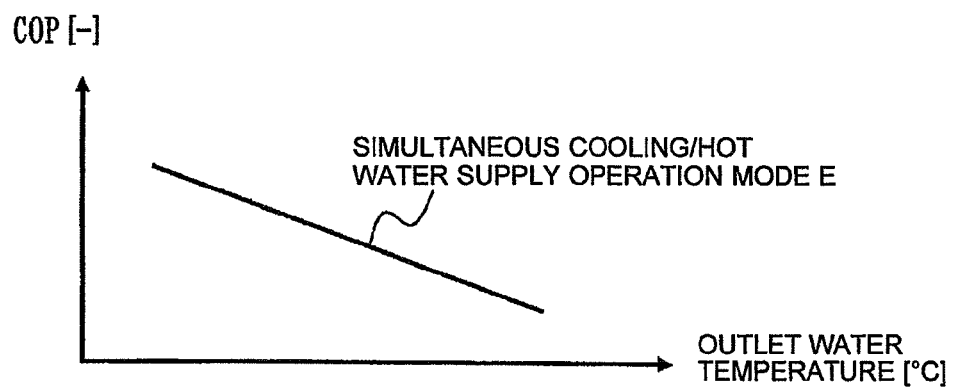
FIG. 13 is a diagram illustrating the relationship between outlet warm water and the COP in the simultaneous cooling/hot water supply operation mode E.
Figure 14:
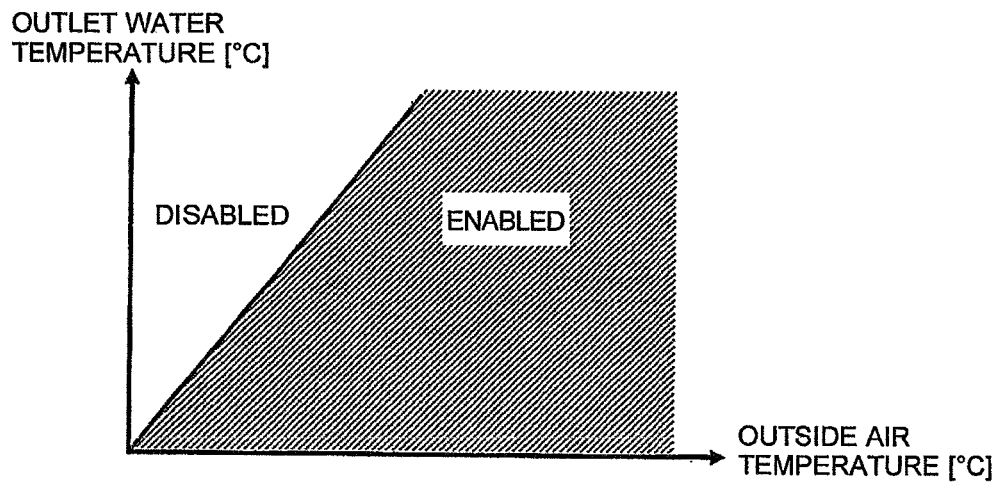
FIG. 14 is an explanatory diagram of a control method for the cooling operation mode A and the simultaneous cooling/hot water supply operation mode E in the waste heat recovery priority mode.

FIG. 11 is a Mollier diagram for the cooling operation mode A and the simultaneous cooling/hot water supply operation mode E. FIG. 12 is a diagram illustrating the relationship between the outside air temperature and the COP in the cooling operation mode A. FIG. 13 is a diagram illustrating the relationship between outlet warm water and the COP in the simultaneous cooling/hot water supply operation mode E. FIG. 14 is an explanatory diagram of a control method for the cooling operation mode A and the simultaneous cooling/hot water supply operation mode E in the waste heat recovery priority mode.

Since the boiling temperature is generally higher than the outside air temperature, as illustrated in FIG. 11, the high-pressure-side pressure in the simultaneous cooling/hot water supply operation mode E is higher than that in the cooling operation mode A. For this reason, the compressor input W [kW] in the simultaneous cooling/hot water supply operation mode E is larger than the compressor input W' [kW] in the cooling operation mode A. In the simultaneous cooling/hot water supply operation mode E, since the amount of compressor input increases, the operating efficiency becomes poor if the heat rejection capacity is not recovered.

As illustrated in FIG. 12, since the heat exchanger 4 serves as a condenser in the cooling operation mode A, the COP, which is the operating efficiency, decreases as the outside air temperature, which is the temperature obtained by the outside air temperature sensor 204, increases. Further, as illustrated in FIG. 13, since the heat exchanger 14a serves as a condenser in the simultaneous cooling/hot water supply operation mode E, the COP, which is the operating efficiency, decreases as the outlet water temperature, which is the temperature detected by the outlet water temperature sensor 210a, increases.

According to the characteristics described above, if the outlet water temperature is high and the outside air temperature is low, the operating efficiency for the cooling operation mode A is higher than that for the simultaneous cooling/hot water supply operation mode E. Hence, in this case, the cooling operation mode A, rather than the simultaneous cooling/hot water supply operation mode E, may be executed in a case where the cooling load is present and the hot water supply load is absent.

A method for performing this operation in the waste heat recovery priority mode is as follows. As illustrated in FIG. 14, a range in which the waste heat recovery priority mode is disabled in accordance with the outlet water temperature and the outside air temperature even if the waste heat recovery priority mode is selected is determined. Specifically, for example, the priority control unit 108 disables the waste heat recovery priority mode and does not execute the second boiling and hot water supply if the outlet water temperature (degrees C.) is a certain number of times (for example, two) or more higher than the outside air temperature (degrees C.), and otherwise enables the waste heat recovery priority mode and executes the second boiling and hot water supply. Furthermore, if the outlet water temperature is higher than the outside air temperature by a certain temperature or more, the priority control unit 108 may disable the waste heat recovery priority mode and may not execute the second boiling and hot water supply.

Doing so can suppress the transition to the simultaneous cooling/hot water supply operation mode E even though the operating efficiency for the cooling operation mode A is higher than that for the simultaneous cooling/hot water supply operation mode E. That is, an operation can be performed so that an occasion in which the operating efficiency is high is determined and waste heat recovery is actively performed.

While a determination method based on the outlet water temperature and the outside air temperature has been described, the determination method is not limited thereto.

For example, instead of the outlet water temperature, the temperature of water at another position in the first water circuit, such as the inlet water temperature, which is the temperature obtained by the temperature sensor 209a, or the tank water temperatures, which are the temperatures obtained by the temperature sensors 211a to 211d, may be used.

Additionally, instead of determination using both the outlet water temperature and the outside air temperature, determination based on either the outlet water temperature or the outside air temperature may be performed. Doing so allows simpler specification of the range for enablement and disablement of the waste heat recovery priority mode.

In the foregoing description, the opportunities to execute the hot water supply operation mode C in which the hot water supply operation is performed independently is reduced as much as possible, whereas the simultaneous cooling/hot water supply operation mode E is executed many times, and precooling is executed. The reason that the simultaneous cooling/hot water supply operation mode E is executed many times is that, whereas in the hot water supply operation mode C, the heat rejection capacity is only utilized as a hot water supply capacity, in the simultaneous cooling/hot water supply operation mode E, the heat rejection capacity is utilized as a hot water supply capacity and additionally the evaporation capacity can be utilized as a cooling capacity.

However, the operating efficiency for the simultaneous cooling/hot water supply operation mode E is not always higher than that for the hot water supply operation mode C. An operational method for further sufficiently exercising the energy saving capacity taking this fact into account will be described with reference to FIG. 15 to FIG. 18.

Figure 15:
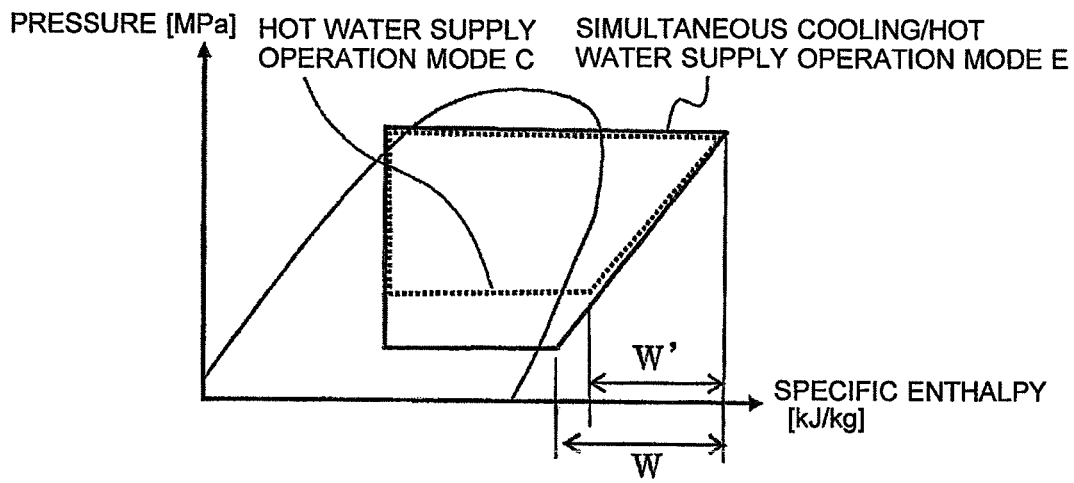
FIG. 15 is a Mollier diagram for the hot water supply operation mode C and the simultaneous cooling/hot water supply operation mode E.
Figure 16:
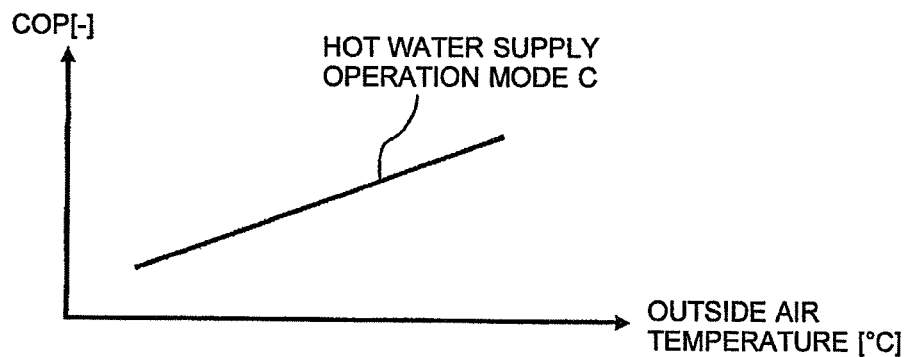
FIG. 16 is a diagram illustrating the relationship between the outside air temperature and the COP in the hot water supply operation mode C.
Figure 17:
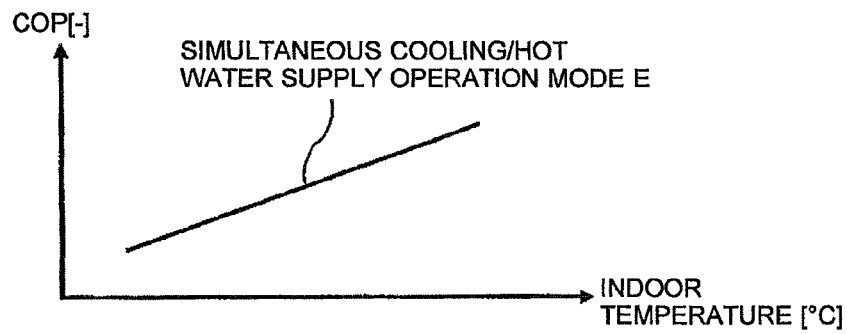
FIG. 17 is diagram illustrating the relationship between the indoor temperature and the COP in the simultaneous cooling/hot water supply operation mode E.
Figure 18:
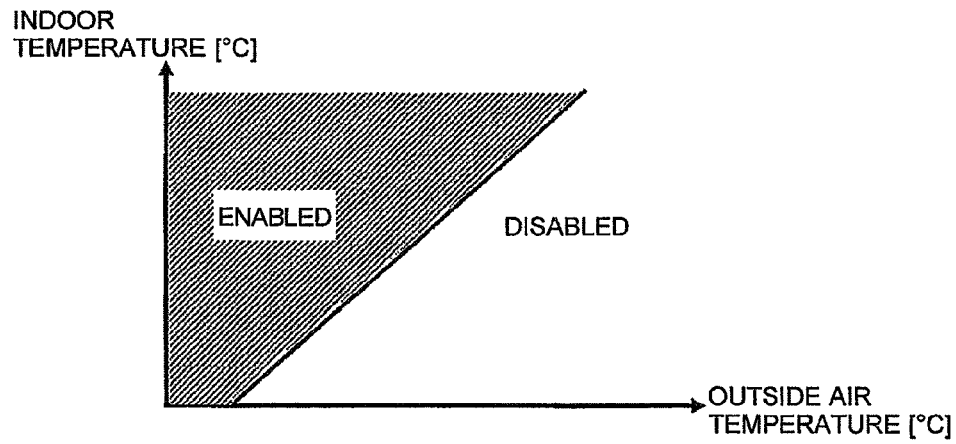
FIG. 18 is an explanatory diagram of a control method for the hot water supply operation mode C and the simultaneous cooling/hot water supply operation mode E in the waste heat recovery priority mode.

FIG. 15 is a Mollier diagram for the hot water supply operation mode C and the simultaneous cooling/hot water supply operation mode E. FIG. 16 is a diagram illustrating the relationship between the outside air temperature and the COP in the hot water supply operation mode C. FIG. 17 is a diagram illustrating the relationship between the indoor temperature and the COP in the simultaneous cooling/hot water supply operation mode E. FIG. 18 is an explanatory diagram of a control method for the hot water supply operation mode C and the simultaneous cooling/hot water supply operation mode E in the waste heat recovery priority mode.

Since the heat transfer capacity of the heat exchanger 4 is generally higher than the heat transfer capacity of the heat exchanger 9a, as illustrated in FIG. 15, the low-pressure-side pressure is lower in the simultaneous cooling/hot water supply operation mode E than in the hot water supply operation mode C. For this reason, the compressor input W [kW] in the simultaneous cooling/hot water supply operation mode E is larger than the compressor input W' [kW] in the cooling operation mode A. In the simultaneous cooling/hot water supply operation mode E, since the amount of compressor input increases, the operating efficiency becomes poor if the evaporation capacity is not recovered.

As illustrated in FIG. 16, since the heat exchanger 4 serves as an evaporator in the hot water supply operation mode C, the COP, which is the operating efficiency, increases as the outside air temperature, which is the temperature obtained by the outside air temperature sensor 204, increases. Further, as illustrated in FIG. 17, since the heat exchanger 9a serves as an evaporator in the simultaneous cooling/hot water supply operation mode E, the COP, which is the operating efficiency, increases as the indoor temperature, which is the temperature obtained by the indoor suction temperature sensor 207a, increases.

According to the characteristics described above, if the outside air temperature is high and the indoor temperature is low, the operating efficiency for the hot water supply operation mode C is higher than that for the simultaneous cooling/ hot water supply operation mode E. Hence, in this case, the hot water supply operation mode C may be executed in a case where the hot water supply load is present and the cooling load is absent.

A method for performing this operation in the waste heat recovery priority mode is as follows. As illustrated in FIG. 18, a range in which the waste heat recovery priority mode is disabled in accordance with the indoor temperature and the outside air temperature even if the waste heat recovery priority mode is selected is determined. Specifically, for example, the priority control unit 108 disables the waste heat recovery priority mode and does not execute the precooling if the indoor temperature is lower than the outside air temperature by a certain temperature (for example, 10 degrees C.), and otherwise enables the waste heat recovery priority mode and executes the precooling. Furthermore, for example, if the outside air temperature (degrees C.) is a certain number of times or more higher than the indoor temperature (degrees C.), the priority control unit 108 may disable the waste heat recovery priority mode and may not execute the second boiling and hot water supply.

Doing so can suppress the transition to the simultaneous cooling/hot water supply operation mode E even though the operating efficiency for the hot water supply operation mode C is higher than that for the simultaneous cooling/hot water supply operation mode E. That is, an operation can be performed so that an occasion in which the operating efficiency is high is determined and waste heat recovery is actively performed.

Instead of determination using both the indoor temperature and the outside air temperature, determination based on either the indoor temperature or the outside air temperature may be performed. Doing so allows simpler specification of the range for enablement and disablement of the waste heat recovery priority mode.

Additionally, the user may be allowed to set the enablement and disablement of the waste heat recovery priority mode in accordance with their use. Doing so makes it possible to perform a waste heat recovery operation in accordance with the user's intention.

Figure 19:
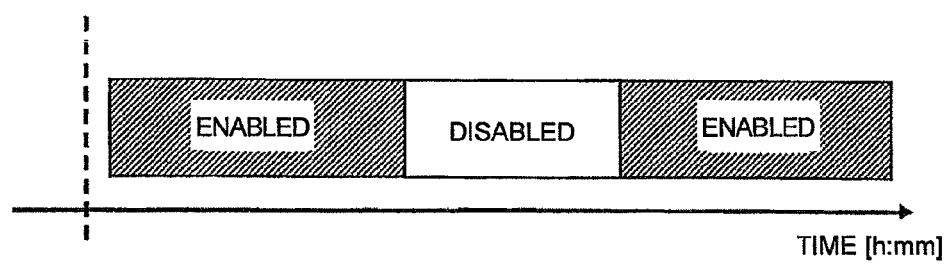
FIG. 19 is an explanatory diagram of switching of the waste heat recovery priority mode based on time.

For example, as illustrated in FIG. 19, setting based on time may be performed. Thus, the operation of accumulating heat in the hot water storage tank 16 or the room is performed in order to provide many opportunities for the user to use the accumulated heat. In the case of the setting based on time, the determination of enablement or disablement may be individually set for the precooling and the second boiling and hot water supply.

For example, it is assumed that the user has a three-person family with two adults and one child. It is also assumed that the two adults go to work and the child goes to school, namely, none of the residents is at home, from 10 a.m. to 2 p.m. In this case, the user sets settings through the input unit 109 of the remote controller 102 so as to disable the precooling in the waste heat recovery priority mode from 10 a.m. to 2 p.m. and enable the precooling in the other time zone. This can prevent precooling of a room that no one enters for a while. It is also assumed that hot water is not planned to be consumed during bedtime from 11 p.m. to 6 a.m. In this case, the user sets settings through the input unit 109 of the remote controller 102 so as to disable the second boiling and hot water supply in the waste heat recovery priority mode from 11 p.m. to 6 a.m. and enable the second boiling temperature in the other time zone. This can prevent the hot water supply operation from being performed despite the fact that no one will use hot water for a while. The setting based on time may be performed for every day of week.

Figure 20:
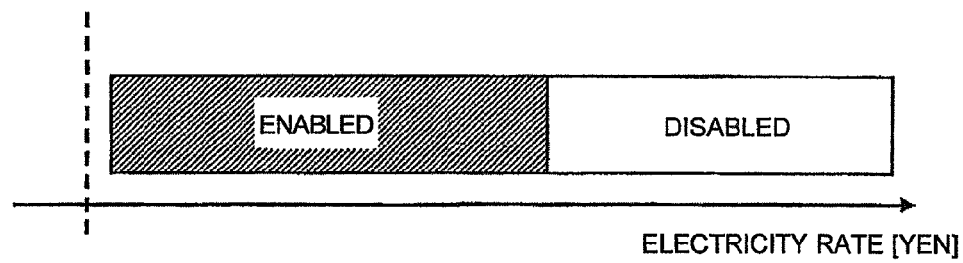
FIG. 20 is an explanatory diagram of switching of the waste heat recovery priority mode based on electricity rate.

Alternatively, for example, as illustrated in FIG. 20, setting based on electricity rate may be performed. As illustrated in FIG. 11 and FIG. 15, the simultaneous cooling/hot water supply operation mode E requires a large amount of input, and therefore also requires large power consumption. Hence, if the electricity rate for a unit amount of electric power is high, the waste heat recovery priority mode is disabled to avoid electricity rate increases.

For example, the user perform setting by inputting an electricity charge for a unit amount of electric power for which they wish to disable the waste heat recovery priority mode through the input unit 109 of the remote controller 102. During the operation, the communication unit 105 externally acquires information on the electricity rate for a unit amount of electric power at that time. If, for the electricity rate for a unit amount of electric power, the charge acquired by the communication unit 105 is greater than or equal to the charge input by the user, the priority control unit 108 disables the waste heat recovery priority mode, and does not execute the second boiling and hot water supply or the precooling.

Furthermore, the amount of power consumption, the accumulated duration of operation of the heat pump apparatus 100, and the accumulated duration of execution of the precooling and the second boiling and hot water supply may be measured using the measurement unit 103, and the sums may be computed daily, weekly, or monthly, and stored in the storage unit 106. The user may be allowed to check the amount of power consumption and the accumulated duration through the display unit 110 of the remote controller 102.

This allows the user to check how much the amount of power consumption has been reduced by using the waste heat recovery priority mode, and can encourage the user to actively set and use the waste heat recovery priority mode.

At this time, an illustration (such as marks and signs) may be output to the display unit 110 of the remote controller 102 in accordance with the ratio of the accumulated duration of execution of the precooling and the second boiling and hot water supply to the accumulated duration of operation of the heat pump apparatus 100. This allows the user to grasp the execution state of the waste heat recovery priority mode at a glance. Here, the accumulated duration of execution of the precooling and the second boiling and hot water supply may be the accumulated duration of either the precooling or the second boiling and hot water supply.

Embodiment 2

First, the configuration of a heat pump apparatus 100 according to Embodiment 2 will be described.

Figure 21:
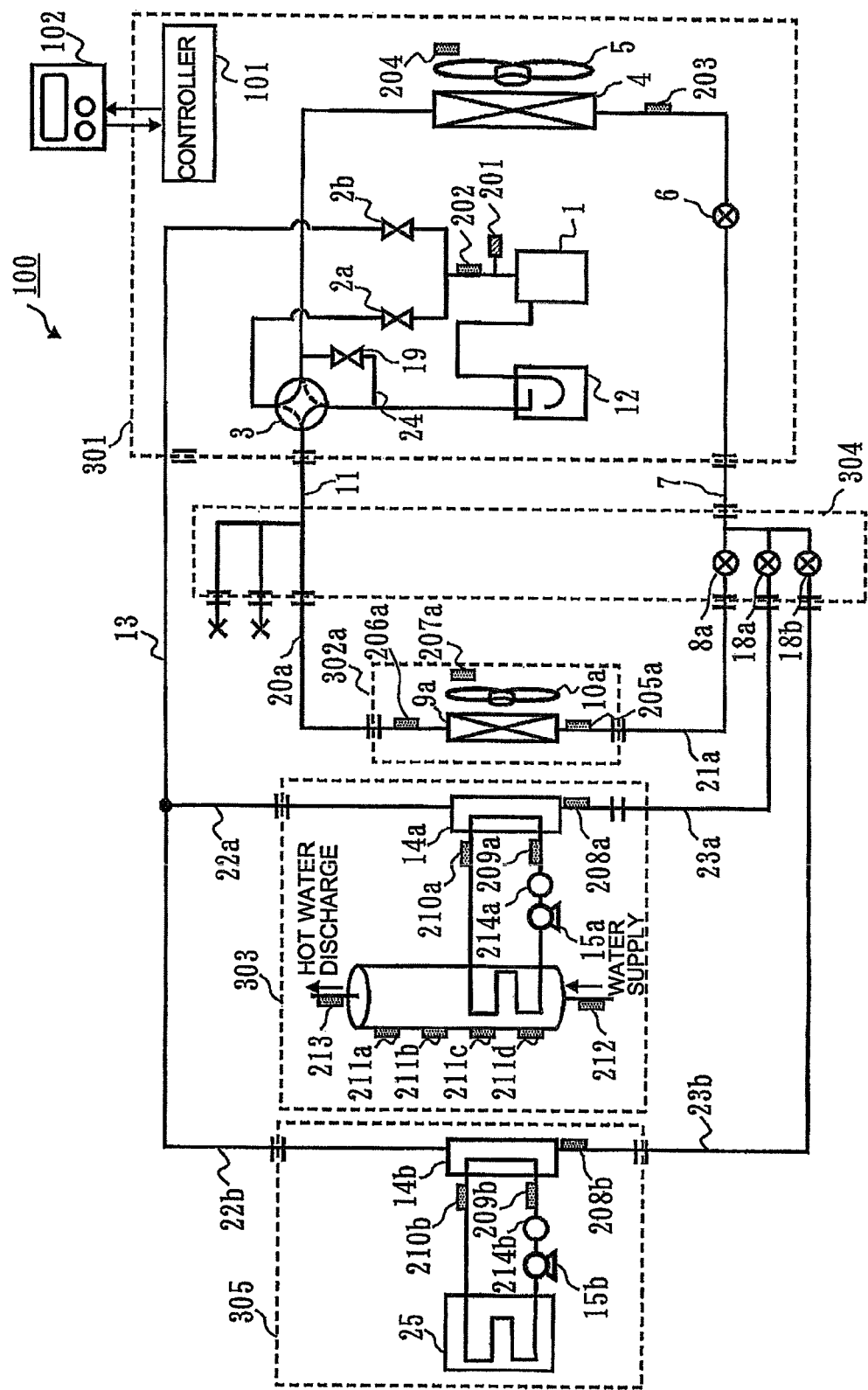
FIG. 21 is a refrigerant circuit configuration diagram of a heat pump apparatus 100 according to Embodiment 2.

FIG. 21 is a refrigerant circuit configuration diagram of the heat pump apparatus 100 according to Embodiment 2. The same portions of the heat pump apparatus 100 according to Embodiment 2 as those of the heat pump apparatus 100 according to Embodiment 1 illustrated in FIG. 1 are assigned the same numerals, and a description will be given mainly of a difference from the heat pump apparatus 100 according to Embodiment 1.

The heat pump apparatus 100 according to Embodiment 2 includes, in addition to the configuration of the heat pump apparatus 100 according to Embodiment 1, a third refrigerant passage that connects the node between the pressure reducing mechanism 6 and the pressure reducing mechanism 8a to a node between the heat exchanger 14a and the solenoid valve 2b with pipes. A pressure reducing mechanism 18b (fourth pressure reducing mechanism) and a heat exchanger 14b (fourth heat exchanger) are sequentially connected to the third refrigerant passage.

The heat pump apparatus 100 further includes a second water circuit in which the heat exchanger 14b, a water pump 15b, and a heat exchange panel 25 are sequentially connected with pipes. Water, which is a heat exchange medium, circulates as intermediate water in the second water circuit.

The heat pump apparatus 100 includes a branch unit 304 and a warm water heating unit 305 (third use device) in addition to the heat source unit 301, the indoor unit 302a, and the hot water supply unit 303.

The branch unit 304 includes the pressure reducing mechanism 8a and the pressure reducing mechanisms 18a and 18b, and is connected between the heat source unit 301 and the other units (the indoor unit 302a, the hot water supply unit 303, and the warm water heating unit 305). In Embodiment 1, the pressure reducing mechanism 8a and the pressure reducing mechanism 18a are components of the heat source unit 301.

In this manner, the additional provision of the branch unit 304 allows the connection settings of a plurality of units (here, the indoor unit 302a, the hot water supply unit 303, and the warm water heating unit 305) without modifying the refrigerant circuit on the heat source unit side.

The warm water heating unit 305 includes the heat exchanger 14b, the water pump 15b, and the heat exchange panel 25.

The heat exchanger 14b is formed of, for example, a plate-type water heat exchanger, and exchanges heat between the intermediate water flowing through the second water circuit and the refrigerant to convert the intermediate water into warm water. The water pump 15b is a pump that allows the intermediate water to circulate through the second water circuit, and makes the flow rate of water to be supplied to the heat exchanger 14b variable. The heat exchange panel 25 is, for example, a radiator or a floor heating panel, and exchanges heat between the water flowing into the second water circuit and the ambient air.

The warm water heating unit 305 is further provided with temperature sensors 208b, 209b, and 210b and a flow rate sensor 214b.

The temperature sensor 208b is disposed on the liquid side of the heat exchanger 14b, and detects the temperature of the liquid refrigerant. The temperature sensor 209b is disposed in the water flow-in portion of the heat exchanger 14b of the first water circuit, and detects the temperature (inlet water temperature) of the water flowing into the heat exchanger 14b. The temperature sensor 210b is disposed in the water flow-out portion of the heat exchanger 14b of the first water circuit, and detects the temperature (outlet water temperature) of the water flowing out of the heat exchanger 14b. The flow rate sensor 214b is disposed between the water pump 15b and the heat exchanger 14b, and detects the volume flow rate of the water flowing into the heat exchanger 14b.

Next, the operation of the heat pump apparatus 100 according to Embodiment 2 will be described.

The heat pump apparatus 100 according to Embodiment 2 executes three operation modes, namely, a water warming operation mode F, a simultaneous cooling/water warming operation mode G, and a simultaneous cooling/water warming/hot water supply operation mode H, in addition to the five operation modes executable by the heat pump apparatus 100 according to Embodiment 1.

The refrigerant flow method of the heat pump apparatus 100 and a control method for the individual devices in the three operation modes will be described.

<Water Warming Operation Mode F>

Figure 22:
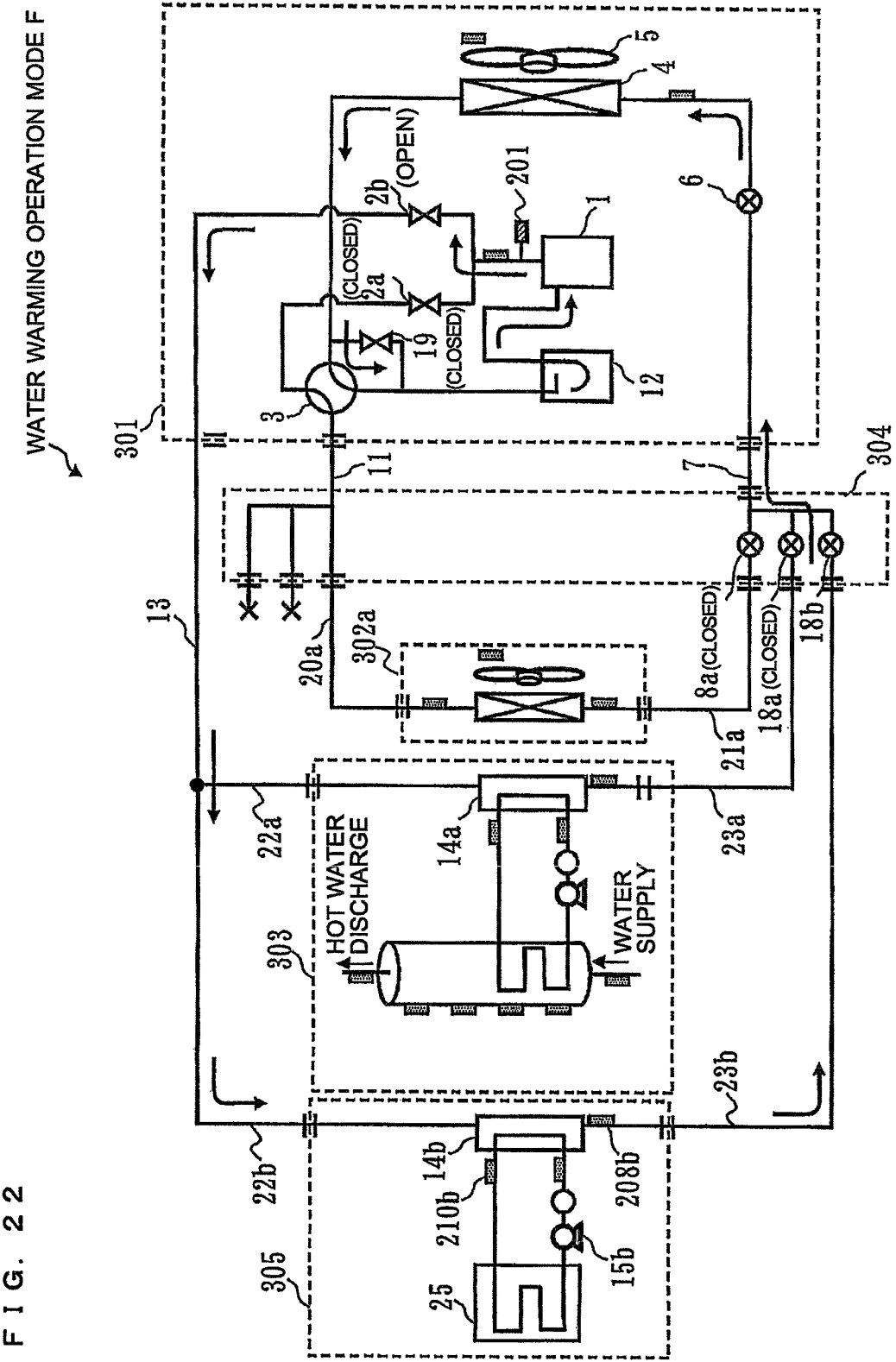
FIG. 22 is a diagram illustrating the flow of a refrigerant and a control method for individual devices in a water warming operation mode F.

FIG. 22 is a diagram illustrating the flow of the refrigerant and a control method for the individual devices in the water warming operation mode F.

In the water warming operation mode F, the four-way valve 3 is set to allow the flow indicated by the broken line in FIG. 21. The four-way valve 3 may be set so as to connect the accumulator 12 and the heat exchanger 4, and need not connect the heat exchanger 9a and the solenoid valve 2a. The solenoid valve 2a is set to closed position, the solenoid valve 2b to open position, and the solenoid valve 19 to closed position. The pressure reducing mechanism 8a and the pressure reducing mechanism 18a are set to the minimum opening degree (fully closed).

The high-temperature, high-pressure gaseous refrigerant discharged from the compressor 1 flows into the solenoid valve 2b, and flows out of the heat source unit 301. The refrigerant flowing out of the heat source unit 301 flows into the warm water heating unit 305 through the pipe 13 and a pipe 22b. Since the pressure reducing mechanism 18a is fully closed, no refrigerant flows through the hot water supply unit 303. The refrigerant flowing into the warm water heating unit 305 flows into the heat exchanger 14b, and heats the water supplied by the water pump 15b to become a high-pressure liquid refrigerant. The high-pressure liquid refrigerant flows out of the heat exchanger 14b, and flows out of the warm water heating unit 305. The refrigerant flowing out of the warm water heating unit 305 flows into the branch unit 304 through a pipe 23b, and passes through the pressure reducing mechanism 18b controlled to be fully open. The refrigerant passing through the pressure reducing mechanism 18b flows out of the branch unit 304, and flows into the heat source unit 301 through the pipe 7. The refrigerant flowing into the heat source unit 301 flows into the pressure reducing mechanism 6, and is subjected to pressure reduction to become a low-pressure two-phase refrigerant. The pressure reducing mechanism 6 is controlled to an opening degree at which the degree of subcooling of the heat exchanger 14b has a certain value. The degree of subcooling of the heat exchanger 14b is determined by subtracting the temperature obtained by the temperature sensor 208b from the saturation temperature at the pressure obtained by the pressure sensor 201.

The low-pressure two-phase refrigerant flows into the heat exchanger 4, and cools the outdoor air supplied by the fan 5 to become a low-pressure gaseous refrigerant. The low-pressure gaseous refrigerant flows out of the heat exchanger 4, flows into the accumulator 12 through the four-way valve 3, and is then again sucked into the compressor 1. The compressor 1 is controlled so that the temperature obtained by the temperature sensor 210b has a certain target value.

<Simultaneous Cooling/Water Warming Operation Mode G>

Figure 23:
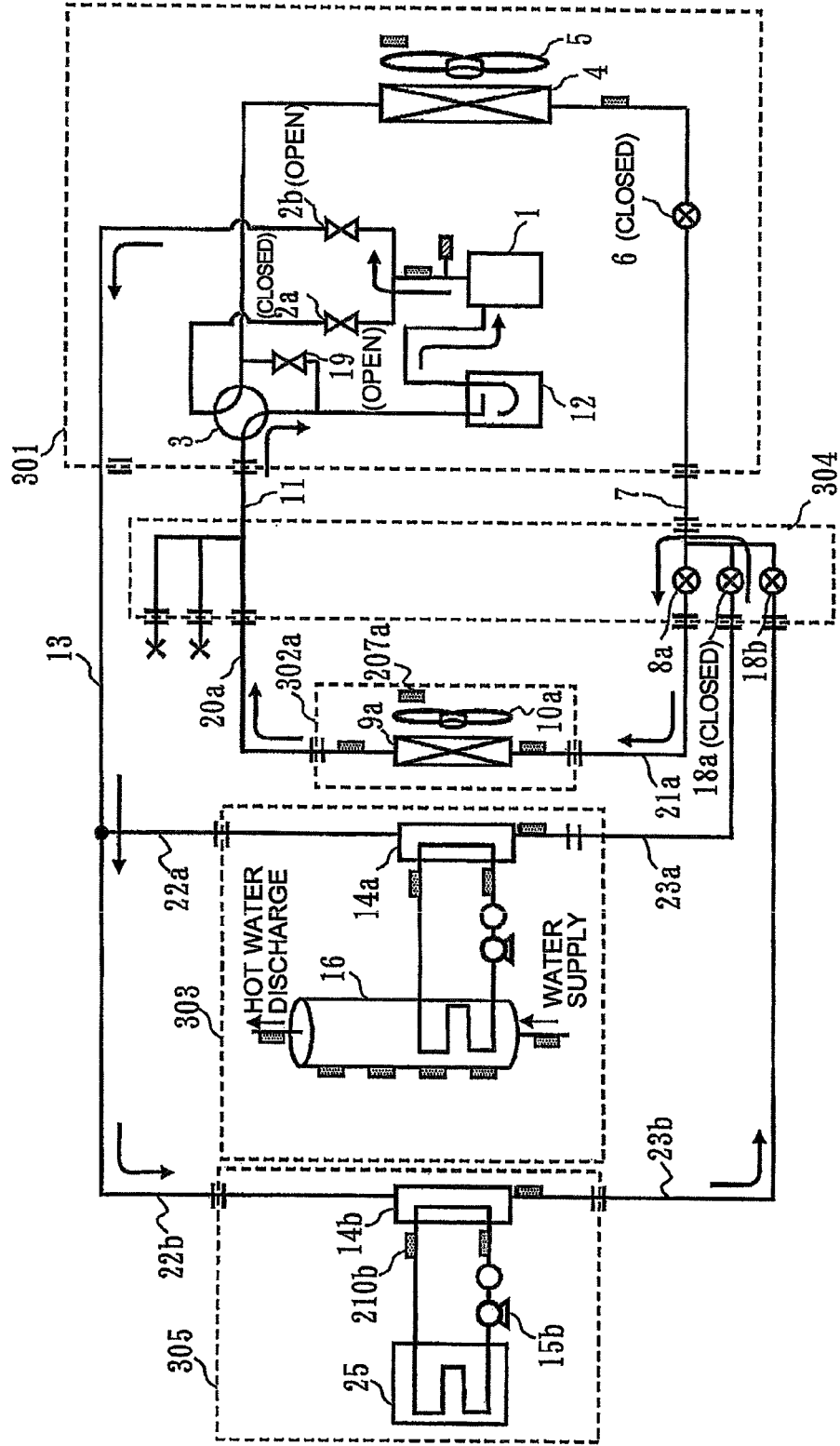
FIG. 23 is a diagram illustrating the flow of a refrigerant and a control method for individual devices in a simultaneous cooling/water warming operation mode G.

FIG. 23 is a diagram illustrating the flow of the refrigerant and a control method for the individual devices in the simultaneous cooling/water warming operation mode G.

In the simultaneous cooling/water warming operation mode G, the four-way valve 3 is set to allow the flow indicated by the solid line in FIG. 21. The four-way valve 3 may be set so as to connect the accumulator 12 and the heat exchanger 9a, and need not connect the solenoid valve 2a and the heat exchanger 4. The solenoid valve 2a is set to closed position, the solenoid valve 2b to open position, and the solenoid valve 19 to open position. The pressure reducing mechanism 18a and the pressure reducing mechanism 6 are set to the minimum opening degree (fully closed).

The high-temperature, high-pressure gaseous refrigerant discharged from the compressor 1 flows into the solenoid valve 2b, and flows out of the heat source unit 301. The refrigerant flowing out of the heat source unit 301 flows into the warm water heating unit 305 through the pipe 13 and the pipe 22b. Since the pressure reducing mechanism 18a is fully closed, no refrigerant flows through the hot water supply unit 303. The refrigerant flowing into the warm water heating unit 305 flows into the heat exchanger 14b, and heats the water supplied by the water pump 15b to become a high-pressure liquid refrigerant. The high-pressure liquid refrigerant flows out of the heat exchanger 14b, and flows out of the warm water heating unit 305. The refrigerant flowing out of the warm water heating unit 305 flows into the branch unit 304 through the pipe 23b, and passes through the pressure reducing mechanism 18b controlled to be fully open. The refrigerant passing through the pressure reducing mechanism 18b flows into the pressure reducing mechanism 8a, undergoes pressure reduction to become a low-pressure two-phase refrigerant, and flows out of the branch unit 304. The pressure reducing mechanism 8a is controlled so that the degree of superheat of the heat exchanger 9a has a certain value.

The low-pressure two-phase refrigerant flows into the indoor unit 302a through a pipe 21a. The refrigerant flowing into the indoor unit 302a flows into the heat exchanger 9a, and cools the indoor air supplied by the fan 10a to become a low-pressure gaseous refrigerant. The low-pressure gaseous refrigerant flows out of the heat exchanger 9a, and flows out of the indoor unit 302a. The refrigerant flowing out of the indoor unit 302a flows into the heat source unit 301 through a pipe 20a. The refrigerant flowing into the heat source unit 301 flows into the accumulator 12 through the four-way valve 3, and is then again sucked into the compressor 1.

The control method for the compressor 1 is determined in accordance with whether cooling priority where the compressor 1 is controlled in accordance with the cooling load or warm water heating priority where the compressor 1 is controlled in accordance with the warm water heating load is to be used. In principle, the operation is carried out with cooling priority. In the case of cooling priority, the compressor 1 is controlled so that the difference between the temperature obtained by the temperature sensor 207a in the indoor unit 302a and the indoor setting temperature is small. If operation is performed with cooling priority and the temperature (warm-water-outlet water temperature) detected by the water temperature sensor 210b is less than or equal to a certain target value, warm water heating priority is used and the compressor 1 is controlled so that the warm-water-outlet water temperature has the certain target value.

The specifications described above can prevent an uncooled state from occurring where cooling is not performed in the indoor unit 302a that is to perform the cooling operation. It can also prevent an unheated state from occurring where heating is not performed in the warm water heating unit 305 that is to perform the heating operation.

<Simultaneous Cooling/Water Warming/Hot Water Supply Operation Mode H>

Figure 24:
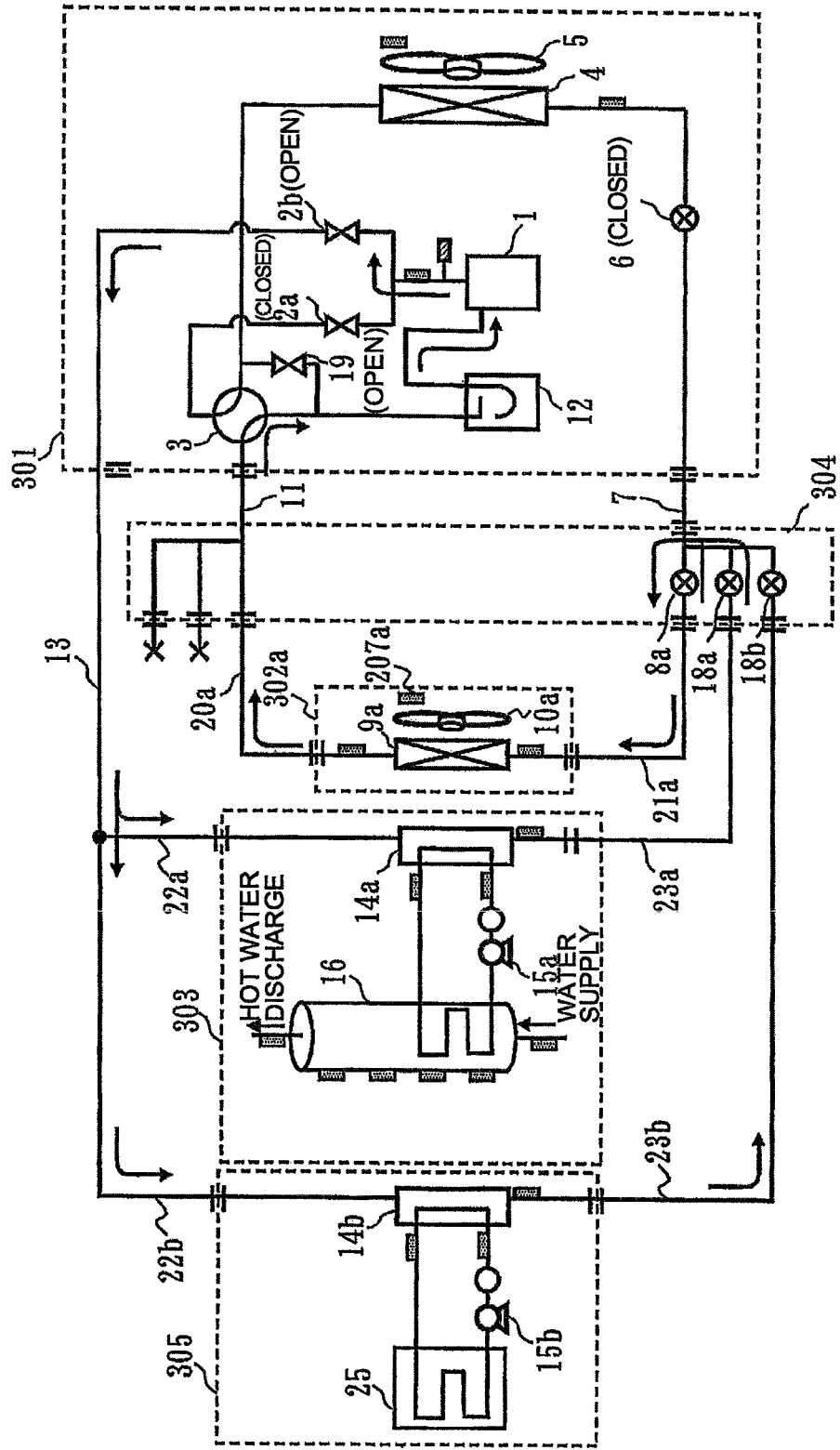
FIG. 24 is a diagram illustrating the flow of a refrigerant and a control method for individual devices in a simultaneous cooling/water warming/hot water supply operation mode H.

FIG. 24 is a diagram illustrating the flow of the refrigerant and a control method for the individual devices in the simultaneous cooling/water warming/hot water supply operation mode H.

In the simultaneous cooling/water warming/hot water supply operation mode H, the four-way valve 3 is set to allow the flow indicated by the solid line in FIG. 21. The four-way valve 3 may be set so as to connect the accumulator 12 and the heat exchanger 9a, and need not connect the solenoid valve 2a and the heat exchanger 4. The solenoid valve 2a is set to closed position, the solenoid valve 2b to open position, and the solenoid valve 19 to open position. The pressure reducing mechanism 6 is set to the minimum opening degree (fully closed).

The high-temperature, high-pressure gaseous refrigerant discharged from the compressor 1 flows into the solenoid valve 2b, and flows out of the heat source unit 301. The refrigerant flowing out of the heat source unit 301 flows through the pipe 13, and is then distributed into a pipe 22a and the pipe 22b.

The refrigerant flowing through the pipe 22a flows into the hot water supply unit 303. The refrigerant flowing into the hot water supply unit 303 flows into the heat exchanger 14a, and heats the water supplied by the water pump 15a to become a high-pressure liquid refrigerant. The high-pressure liquid refrigerant flows out of the heat exchanger 14a, and flows out of the hot water supply unit 303. The refrigerant flowing out of the hot water supply unit 303 flows into the branch unit 304 through a pipe 23a, and is subjected to pressure reduction by the pressure reducing mechanism 18a to become a low-pressure two-phase refrigerant. The pressure reducing mechanism 18a is controlled so that the degree of subcooling of the heat exchanger 14a has a certain value.

On the other hand, the refrigerant flowing through the pipe 22b flows into the warm water heating unit 305. The refrigerant flowing into the warm water heating unit 305 flows into the heat exchanger 14b, and heats the water supplied by the water pump 15b to become a high-pressure liquid refrigerant.

The high-pressure liquid refrigerant flows out of the heat exchanger 14b, and flows out of the warm water heating unit 305. The refrigerant flowing out of the warm water heating unit 305 flows into the branch unit 304 through the pipe 23b, and is subjected to pressure reduction by the pressure reducing mechanism 18b to become a low-pressure two-phase refrigerant. The pressure reducing mechanism 18b is controlled so that the degree of subcooling of the heat exchanger 14b has a certain value.

The refrigerant flowing out of the pressure reducing mechanism 18a and the refrigerant flowing out of the pressure reducing mechanism 18b merge. The merging flow of refrigerant passes through the pressure reducing mechanism 8a controlled to a fully-open opening degree, and flows out of the branch unit 304. The refrigerant flowing out of the branch unit 304 flows into the indoor unit 302a through the pipe 21a. The refrigerant flowing into the indoor unit 302a flows into the heat exchanger 9a, and cools the indoor air supplied by the fan 10a to become a low-pressure gaseous refrigerant. The low-pressure gaseous refrigerant flows out of the heat exchanger 9a, and flows out of the indoor unit 302a. The refrigerant flowing out of the indoor unit 302a flows into the heat source unit 301 through the pipe 20a. The refrigerant flowing into the heat source unit 301 flows into the accumulator 12 through the four-way valve 3, and is then again sucked into the compressor 1.

The control method for the compressor 1 is determined in accordance with whether cooling priority where the compressor 1 is controlled in accordance with the cooling load or warm water heating hot water supply priority where the compressor 1 is controlled in accordance with the warm water heating load and the hot water supply load is to be used. In the case of cooling priority, the compressor 1 is controlled so that the difference between the temperature obtained by the temperature sensor 207a in the indoor unit 302a and the indoor setting temperature is small. In the case of warm water heating hot water supply priority, the compressor 1 is controlled at the maximum frequency, aiming to complete hot water supply in a short time period.

Similarly to the heat pump apparatus 100 according to Embodiment 1, the heat pump apparatus 100 according to Embodiment 2 also has a waste heat recovery priority mode to perform the simultaneous cooling/hot water supply operation mode E. That is, the operation illustrated in FIG. 8 can be executed in a manner similar to that in Embodiment 1.

In Embodiment 2, furthermore, in the simultaneous cooling/water warming operation mode G, in a case where the heat rejection capacity is excessive only for the warm water heating unit 305 while operation is performed with cooling priority, and the outlet water temperature becomes excessively high, that is, in the case where an amount of heat that is removable from the refrigerant by heating the intermediate water is less than or equal to the first amount of heat, second boiling and hot water supply that accumulates heat in the hot water supply unit 303 can be executed.

Conventionally, while operation is performed with cooling priority in the simultaneous cooling/water warming operation mode G, it is not possible to process the surplus heat rejection capacity. For this reason, operation needs to be performed by, for example, alternately switching between the simultaneous water heating/cooling operation mode E and the cooling operation mode C, and the surplus heat rejection capacity needs to be wasted by the heat exchanger 4. Therefore, it is not possible to sufficiently exercise the energy saving capacity. However, the heat pump apparatus 100 according to Embodiment 2 can make this operation avoidable. That is, the surplus heat rejection capacity is not wasted and heat can be recovered by and accumulated in the hot water supply unit 303. In other words, a complete waste heat recovery operation is possible, and the energy saving capacity can be sufficiently exercised.

Figure 25:
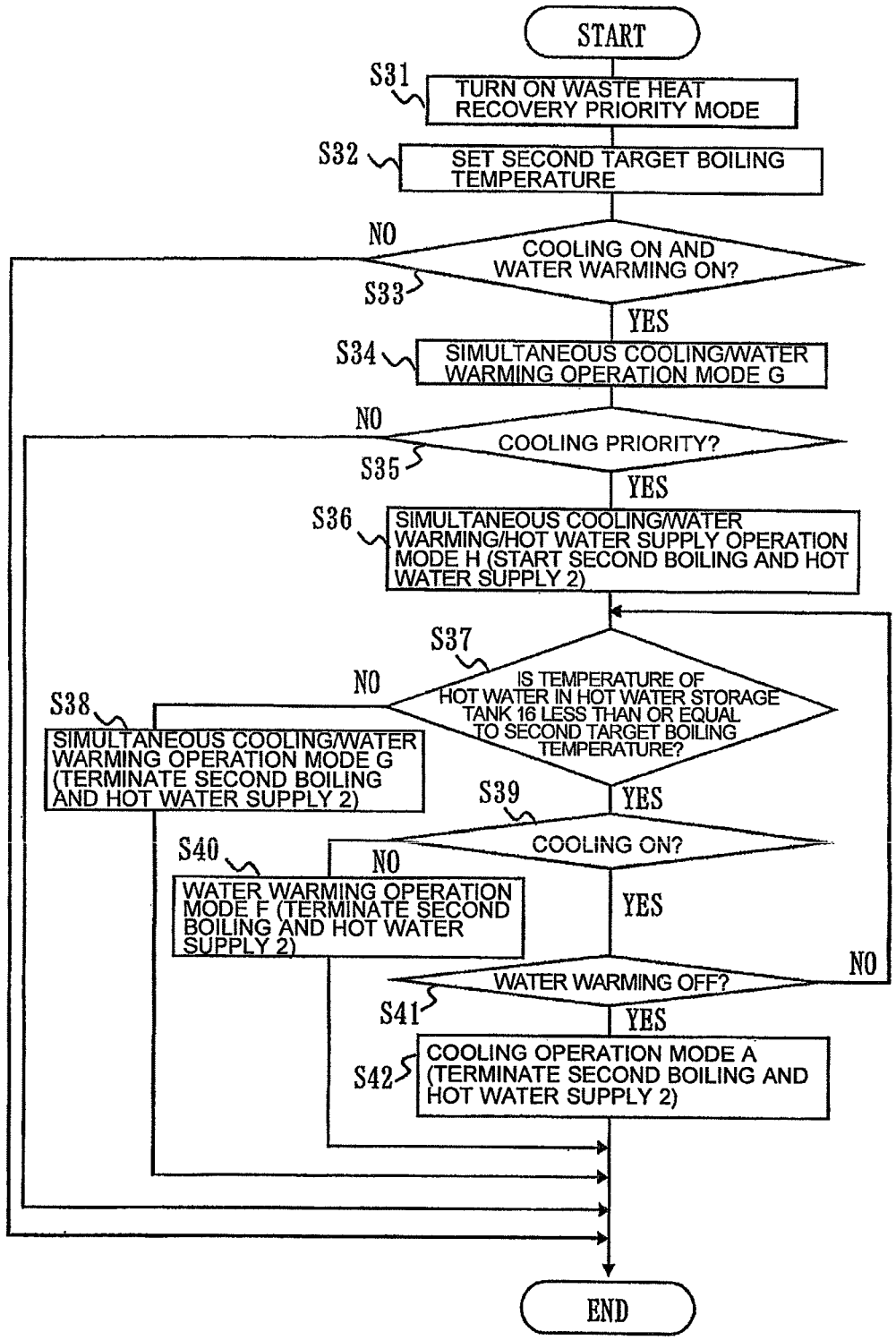
FIG. 25 is a flowchart illustrating the operation for second boiling and hot water supply in Embodiment 2.

FIG. 25 is a flowchart illustrating the operation of the second boiling and hot water supply 2 in Embodiment 2.

First, in S31, the priority control unit 108 turns on the waste heat recovery priority mode. Then, in S32, the priority control unit 108 sets a second target boiling temperature. The second target boiling temperature is similar to that in Embodiment 1. Then, in S33, the priority control unit 108 waits until cooling is turned on by the generation of the cooling load and water warming is turned on by the generation of the warm water heating load.

If cooling is turned on and water warming is turned on in S33 (YES in S33), the priority control unit 108 advances the process to S34. In S34, the priority control unit 108 executes the simultaneous cooling/water warming operation mode G. Then, in S35, the priority control unit 108 waits until the compressor 1 is controlled with cooling priority. In the case of cooling priority, the compressor 1 is controlled in accordance with the required load of the indoor unit 302a. If the compressor 1 is controlled with cooling priority (YES in S35), the priority control unit 108 advances the process to S36 because the surplus heat rejection capacity can be accumulated in the hot water supply unit 303. In S36, the priority control unit 108 executes the simultaneous cooling/water warming/hot water supply operation mode H and starts the second boiling and hot water supply 2. In the simultaneous cooling/water warming/hot water supply operation mode H, the compressor is still controlled with cooling priority.

Then, in S37, the priority control unit 108 determines whether or not the temperature of the hot water in the hot water storage tank 16 is less than or equal to the second target boiling temperature. If the temperature is higher than the second boiling temperature (NO in S37), the priority control unit 108 advances the process to S38. In S38, the priority control unit 108 terminates the second boiling and hot water supply 2, and executes the simultaneous cooling/water warming operation mode G.

On the other hand, if the temperature is less than or equal to the second target boiling temperature (YES in S37), the priority control unit 108 advances the process to S39. In S39, the priority control unit 108 determines whether or not cooling is ON. If cooling is OFF (NO in S39), the priority control unit 108 advances the process to S40. In S40, the priority control unit 108 terminates the second boiling and hot water supply 2, and executes the water warming operation mode F.

On the other hand, if cooling is ON (YES in S39), the priority control unit 108 advances the process to S41. In S41, the priority control unit 108 determines whether or not water warming is OFF. If water warming is ON (NO in S41), the priority control unit 108 returns the process to S37, whereas if water warming is OFF (YES in S41), the priority control unit 108 advances the process to S42. In S42, the priority control unit 108 terminates the second boiling and hot water supply 2, and executes the cooling operation mode A.

Embodiment 3

First, the configuration of a heat pump apparatus 100 according to Embodiment 3 will be described.

Figure 26:
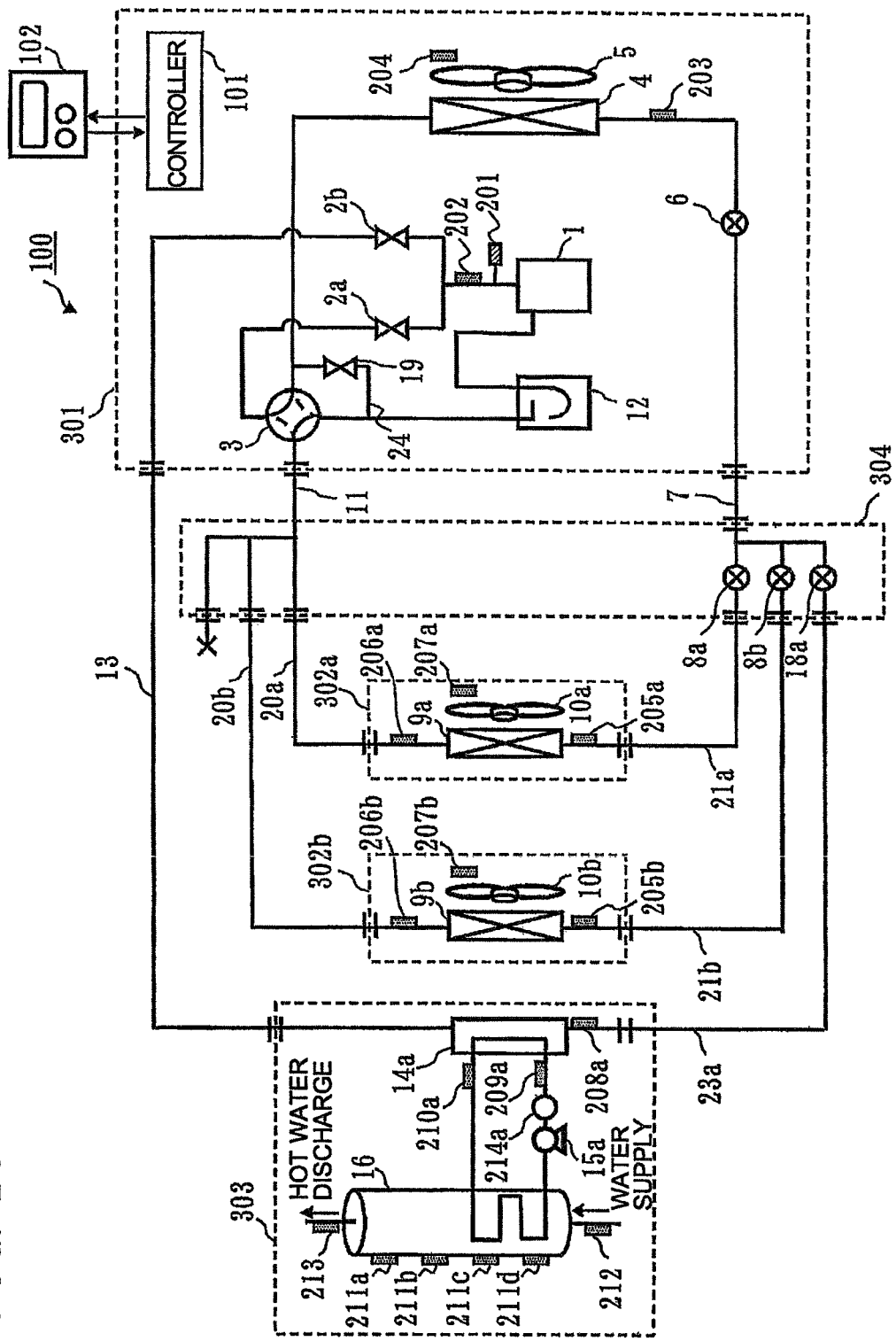
FIG. 26 is a refrigerant circuit configuration diagram of a heat pump apparatus 100 according to Embodiment 3.

FIG. 26 is a refrigerant circuit configuration diagram of the heat pump apparatus 100 according to Embodiment 3. The same portions of the heat pump apparatus 100 according to Embodiment 3 as those of the heat pump apparatus 100 according to Embodiment 1 illustrated in FIG. 1 are assigned the same numerals, and a description will be given mainly of a difference from the heat pump apparatus 100 according to Embodiment 1.

The heat pump apparatus 100 according to Embodiment 3 includes, in addition to the configuration of the heat pump apparatus 100 according to Embodiment 1, a fourth refrigerant passage that connects the node between the pressure reducing mechanism 6 and the pressure reducing mechanism 8a to a node between a heat exchanger 9a and the four-way valve 3 with pipes. A pressure reducing mechanism 8b (fifth pressure reducing mechanism) and the heat exchanger 9b (fifth heat exchanger) are sequentially connected to the fourth refrigerant passage.

The heat pump apparatus 100 includes a branch unit 304 and an indoor unit 302b (fourth use device) in addition to the heat source unit 301, the indoor unit 302a, and the hot water supply unit 303. The indoor unit 302a and the indoor unit 302b may be installed in the same room or in different rooms.

The branch unit 304 includes the pressure reducing mechanisms 8a and 8b and the pressure reducing mechanism 18a, and is connected between the heat source unit 301 and the other units (the indoor units 302a and 302b and the hot water supply unit 303). In Embodiment 1, the pressure reducing mechanism 8a and the pressure reducing mechanism 18a are components of the heat source unit 301.

In this manner, the additional provision of the branch unit 304 allows the connection settings of a plurality of units (here, the indoor units 302a and 302b and the hot water supply unit 303) without modifying the refrigerant circuit on the heat source unit side.

The indoor unit 302b includes the heat exchanger 9b and a fan 10b.

The heat exchanger 9b is, for example, a cross-fin type fin-and-tube heat exchanger including a heat transfer pipe and multiple fins, and exchanges heat between the indoor air (fourth fluid) and the refrigerant. The fan 10b is formed of a centrifugal fan, a multi-blade fan, or the like, which is driven by a DC motor, and is capable of adjusting the amount of air to be sent. The fan 10b is disposed in the vicinity of the heat exchanger 9b. The fan 10b causes indoor air to be sucked into the heat source unit 301 so that the heat exchanger 9b exchanges heat between the refrigerant and the indoor air, and discharges the indoor air that has undergone heat exchange into the room.

The indoor unit 302b is further provided with temperature sensors 205b, 206b, and 207b.

The temperature sensor 205b is disposed on the liquid side of the heat exchanger 9b, and detects the temperature of the liquid refrigerant. The 206b is disposed on the gas side of the heat exchanger 9b, and detects the temperature of the gaseous refrigerant. The 207b is disposed on the indoor air suction inlet side of the indoor unit 302b, and detects the temperature of the indoor air flowing into the unit.

Next, the operation of the heat pump apparatus 100 according to Embodiment 3 will be described.

The heat pump apparatus 100 according to Embodiment 3 executes a simultaneous hot water supply/cooling/precooling operation mode I in addition to the five operation modes executable by the heat pump apparatus 100 according to Embodiment 1. The simultaneous hot water supply/cooling/precooling operation mode I is executed when hot water supply is ON in the hot water supply unit 303 and when cooling is ON in one of the indoor unit 302a and the indoor unit 302b and the other is out of operation.

The refrigerant flow method of the heat pump apparatus 100 and a control method for the individual devices in the simultaneous hot water supply/cooling/precooling operation mode I will be described.

<Simultaneous Hot Water Supply/Cooling/Precooling Operation Mode I>

Figure 27:
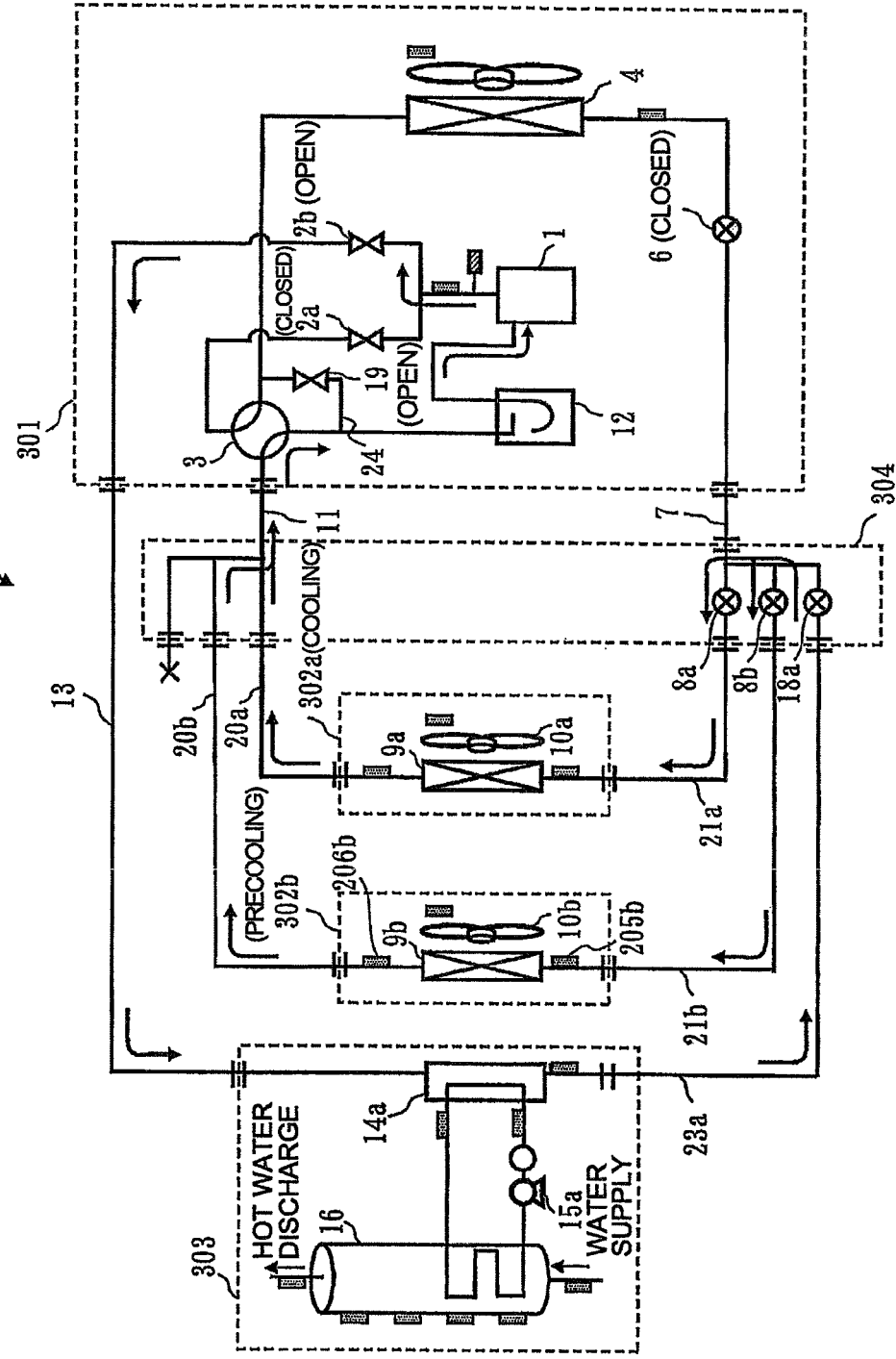
FIG. 27 is a diagram illustrating the flow of a refrigerant and a control method for individual devices in a simultaneous hot water supply/cooling/precooling operation mode I.

FIG. 27 is a diagram illustrating the flow of the refrigerant and a control method for the individual devices in the simultaneous hot water supply/cooling/precooling operation mode I.

In the simultaneous hot water supply/cooling/precooling operation mode I, the four-way valve 3 is set to allow the flow indicated by the solid line in FIG. 26. The four-way valve 3 may be set so as to connect the accumulator 12 and the heat exchanger 9a, and need not connect the solenoid valve 2a and the heat exchanger 4. The solenoid valve 2a is set to closed position, the solenoid valve 2b to open position, and the solenoid valve 19 to open position. The pressure reducing mechanism 6 is set to the minimum opening degree (fully closed).

It is assumed here that the cooling load is present (cooling is ON) in the indoor unit 302a and the cooling load is absent (cooling is OFF) in the indoor unit 302b, which has entered the precooling state.

The high-temperature, high-pressure gaseous refrigerant discharged from the compressor 1 flows into the solenoid valve 2b, flows out of the heat source unit 301, and flows into the hot water supply unit 303 through the pipe 13. The refrigerant flowing into the hot water supply unit 303 flows into the heat exchanger 14a, and heats the water supplied by the water pump 15a to become a high-pressure liquid refrigerant. The high-pressure liquid refrigerant flows out of the heat exchanger 14a, and flows out of the hot water supply unit 303. The refrigerant flowing out of the hot water supply unit 303 flows into the branch unit 304 through the pipe 23a. The refrigerant flowing into the branch unit 304 passes through the pressure reducing mechanism 18a controlled to be fully open, and is distributed into the refrigerant that flows into the pressure reducing mechanism 8a and the refrigerant that flows into the pressure reducing mechanism 8b.

The refrigerant flowing into the pressure reducing mechanism 8a is subjected to pressure reduction to become a low-pressure two-phase refrigerant, and flows out of the branch unit 304. The pressure reducing mechanism 8a is controlled so that the degree of superheat of the heat exchanger 9a has a certain value. The refrigerant flowing out of the branch unit 304 flows into the indoor unit 302a through the pipe 21a. The refrigerant flowing into the indoor unit 302a flows into the heat exchanger 9a, and cools the indoor air supplied by the fan 10a to become a low-pressure gaseous refrigerant. The low-pressure gaseous refrigerant flows out of the heat exchanger 9a, and flows out of the indoor unit 302a. The refrigerant flowing out of the indoor unit 302a flows into the branch unit 304 through the pipe 20a.

On the other hand, the refrigerant flowing into the pressure reducing mechanism 8b is subjected to pressure reduction to become a low-pressure two-phase refrigerant, and flows out of the branch unit 304. The pressure reducing mechanism 8b is controlled so that the degree of superheat of the heat exchanger 9b has a certain value. The degree of superheat of the heat exchanger 9b is determined by subtracting the temperature obtained by the temperature sensor 205b from the temperature obtained by the temperature sensor 206b. The refrigerant flowing out of the branch unit 304 flows into the indoor unit 302b through a pipe 21b. The refrigerant flowing into the indoor unit 302b flows into the heat exchanger 9b, and cools the indoor air supplied by the fan 10b to become a low-pressure gaseous refrigerant. The low-pressure gaseous refrigerant flows out of the heat exchanger 9b, and flows out of the indoor unit 302b. The refrigerant flowing out of the indoor unit 302b flows into the branch unit 304 through a pipe 20b.

The refrigerant flowing into the branch unit 304 from the indoor unit 302a and the refrigerant flowing into the branch unit 304 from the indoor unit 302b merge and flow into the heat source unit 301 through the pipe 11. The refrigerant flowing into the heat source unit 301 flows into the accumulator 12 through the four-way valve 3, and is then again sucked into the compressor 1.

In order to accumulate in the indoor unit 302b the evaporation capacity which is excess only for the indoor unit 302a, the control method for the compressor 1 is hot water supply priority where the compressor 1 is controlled in accordance with the hot water supply load. In hot water supply priority, the compressor 1 is controlled at the maximum frequency, aiming at an operation of maximizing the hot water supply capacity to boil hot water in a short time period.

Similarly to the heat pump apparatus 100 according to Embodiment 1, the heat pump apparatus 100 according to Embodiment 3 can also have a waste heat recovery priority mode to perform the simultaneous cooling/hot water supply operation mode E. That is, the operation illustrated in FIG. 8 can be executed in a manner similar to that in Embodiment 1.

In Embodiment 3, furthermore, in the simultaneous hot water supply/cooling/precooling operation mode I, in a case where the evaporation capacity is excessive only for the indoor unit 302a, and the temperature of the indoor air is lower than the setting temperature, that is, in the case where an amount of heat to be applied to the refrigerant by cooling the indoor air is less than or equal to a second amount of heat, precooling that accumulates heat in the indoor unit 302a can be executed.

Conventionally, while operation is performed with hot water supply priority in the simultaneous cooling/hot water supply operation mode E, it is not possible to process the surplus evaporation capacity. For this reason, operation needs to be performed by, for example, alternately switching between the simultaneous cooling/hot water supply operation mode E and the hot water supply operation mode C, and the surplus evaporation capacity needs to be wasted by the heat exchanger 4. Therefore, it is not possible to sufficiently exercise the energy saving capacity. However, Embodiment 3 can make this operation avoidable. That is, the surplus evaporation capacity is not wasted and heat can be recovered and accumulated in the indoor unit 302b. In other words, a complete waste heat recovery operation is possible, and the energy saving capacity can be sufficiently exercised.

Figure 28:
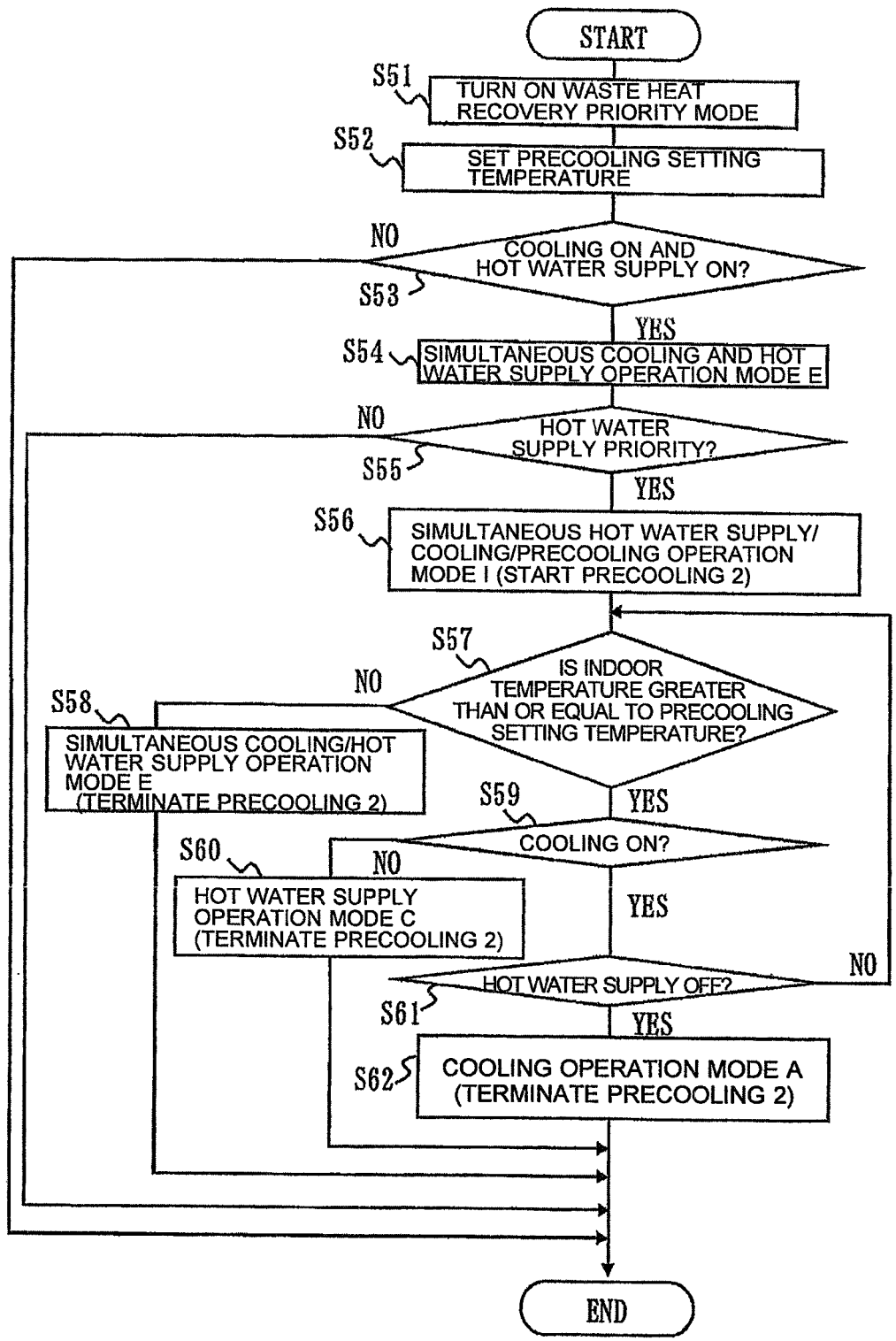
FIG. 28 is a flowchart illustrating a precooling operation in Embodiment 3.

FIG. 28 is a flowchart illustrating a precooling operation in Embodiment 3.

First, in S51, the priority control unit 108 turns on the waste heat recovery priority mode. Then, in S52, the priority control unit 108 sets a precooling setting temperature. The precooling setting temperature is similar to that in Embodiment 1. Then, in S53, the priority control unit 108 waits until cooling is turned on by the generation of the cooling load and hot water supply is turned on by the generation of the hot water supply load.

If cooling is turned on and hot water supply is turned on in S53 (YES in S53), the priority control unit 108 advances the process to S54. In S54, the priority control unit 108 executes the simultaneous cooling/hot water supply operation mode E. Then, in S55, the priority control unit 108 waits until the compressor 1 is controlled with hot water supply priority. In the case of hot water supply priority, the compressor 1 is controlled in accordance with the required load of the hot water supply unit 303. If the compressor 1 is controlled with hot water supply priority (YES in S55), the priority control unit 108 advances the process to S56 because the surplus evaporation capacity can be accumulated in the indoor unit 302a. In S56, the priority control unit 108 executes the simultaneous hot water supply/cooling/precooling operation mode I and starts precooling 2. In the simultaneous hot water supply/cooling/precooling operation mode I, the compressor is still controlled with hot water supply priority.

Then, in S57, the priority control unit 108 determines whether or not the indoor temperature of the room in which the indoor unit 302b is installed is greater than or equal to the precooling setting temperature. If the temperature is less than the precooling setting temperature (NO in S57), the priority control unit 108 advances the process to S58. In S58, the priority control unit 108 terminates the precooling 2, and executes the simultaneous cooling/hot water supply operation mode E.

On the other hand, if the temperature is greater than or equal to the precooling setting temperature (YES in S57), the priority control unit 108 advances the process to S59. In S59, the priority control unit 108 determines whether or not cooling is ON. If cooling is OFF (NO in S59), the priority control unit 108 advances the process to S60. In S60, the priority control unit 108 terminates the precooling 2, and executes the hot water supply operation mode C.

On the other hand, if cooling is ON (YES in S59), the priority control unit 108 advances the process to S61. In S61, the priority control unit 108 determines whether or not hot water supply is OFF. If hot water supply is ON (NO in S61), the priority control unit 108 returns the process to S57, whereas if hot water supply is OFF (YES in S61), the priority control unit 108 advances the process to S62. In S62, the priority control unit 108 terminates the precooling 2, and executes the cooling operation mode A.

REFERENCE SIGNS LIST 1 compressor, 2a, 2b, 19 solenoid valve, 3 four-way valve, 4, 9a, 9b, 14a, 14b heat exchanger, 5 fan, 6, 8, 18a, 18b pressure reducing mechanism, 7, 11, 13, 17, 20, 21, 22, 23 pipe, 10a, 10b fan, 12 accumulator, 15a, 15b water pump, 16 hot water storage tank, 24 bypass pipe, 25 heat exchange panel, 100 heat pump apparatus, 101 controller, 102 remote controller, 103 measurement unit, 104 operation control unit, 105 communication unit, 106 storage unit, 107 clock unit, 108 priority control unit, 109 input unit, 110 display unit, 111 light emitting unit, 201 pressure sensor, 202, 203, 204, 205, 206, 207, 208, 209, 210, 211, 212, 213 temperature sensor, 214 flow rate sensor, 301 heat source unit, 302a, 302b indoor unit, 303 hot water supply unit, 304 branch unit, 305 warm water heating unit.

The invention claimed is:
1. A heat pump apparatus comprising:
a heat source device that cools or heats a refrigerant;
a first use device that cools a first fluid by utilizing the refrigerant cooled by the heat source device;
a second use device that heats a second fluid by utilizing the refrigerant heated by the heat source device; and
a controller that
causes, when there is an operation request for one of the first use device and the second use device, even when there is no operation request for the other, both the one and the other to operate if the other satisfies a certain condition, and causes the first use device and the second use device to perform a waste heat recovery operation and in which the second use device heats the second fluid by utilizing a refrigerant heated by cooling the first fluid in the first use device, wherein the controller determines that there is an operation request for the second use device if a temperature of the second fluid is less than or equal to a first heating temperature set by a user, and when there is the operation request for one of the first use device and the second use device, and both the one and the other are to operate, operates the second use device such that the temperature of the second fluid becomes a second heating temperature that is set higher than the first heating temperature by a certain degrees.

2. The heat pump apparatus of claim 1, wherein
the controller determines that, when there is an operation request for the first use device, even when there is no operation request for the second use device, the second use device satisfies the certain condition if the temperature of the second fluid is less than or equal to the second heating temperature, and causes both the first use device and the second use device to operate so that the waste heat recovery operation is performed by the first use device and the second use device.

3. The heat pump apparatus of claim 2, wherein
the heat source device includes
a first heat exchanger that exchanges heat between the refrigerant and outside air and heats the refrigerant, wherein
the controller further switches whether or not the waste heat recovery operation is to be performed in accordance with an outside air temperature which is a temperature of the outside air.

4. The heat pump apparatus of claim 2, wherein
the heat source device includes
a first heat exchanger that exchanges heat between the refrigerant and outside air and heats the refrigerant, and
the controller further switches whether or not the waste heat recovery operation is to be performed in accordance with a relationship between an outside air temperature which is a temperature of the outside air and the temperature of the second fluid.

5. The heat pump apparatus of claim 2, wherein
the controller further switches whether or not the waste heat recovery operation is to be performed in accordance with time.

6. The heat pump apparatus of claim 2, wherein
the controller further switches whether or not the waste heat recovery operation is to be performed in accordance with an electricity rate for a unit amount of electric power.

7. The heat pump apparatus of claim 1, further comprising:
an input device that receives an operation request for the first use device, wherein
the controller determines that, when there is an operation request for the second use device, even when there is no operation request for the first use device, the first use device satisfies the certain condition if a temperature of the first fluid is greater than or equal to a preset cooling temperature, and causes both the second use device and the first use device to operate to perform the waste heat recovery operation.

8. The heat pump apparatus of claim 7, wherein
the heat source device includes
a first heat exchanger that exchanges heat between the refrigerant and outside air to heat the refrigerant, and
the controller further switches whether or not the waste heat recovery operation is to be performed in accordance with a relationship between an outside air temperature which is a temperature of the outside air and the temperature of the first fluid.

9. The heat pump apparatus of claim 1, further comprising:
an input device that receives an input as to whether or not the waste heat recovery operation is to be performed, wherein
the controller causes the first use device and the second use device to perform the waste heat recovery operation only when the input device has received an input that indicates that the waste heat recovery operation is to be performed.

10. The heat pump apparatus of claim 1, further comprising:
a display device that displays information indicating that the waste heat recovery operation is in progress when the first use device and the second use device are performing the waste heat recovery operation.

11. The heat pump apparatus of claim 1, further comprising:
a third use device that heats a third fluid by utilizing the refrigerant heated by the heat source device, wherein
the controller
causes, when there is an operation request for the first use device and the third use device, a waste heat recovery operation to be performed in which the third use device heats the third fluid by utilizing a refrigerant heated by cooling the first fluid in the first use device, and
causes, even when there is no operation request for the second use device, the second use device to also operate if an amount of heat that is removable from the refrigerant by heating the third fluid in the third use device is less than or equal to a predetermined first amount of heat and if the second use device satisfies the certain condition, and causes a waste heat recovery operation to be performed in which the second use device and the third use device heat the second fluid and the third fluid by utilizing a refrigerant heated by cooling the first fluid in the first use device.

12. The heat pump apparatus of claim 1, further comprising:
a fourth use device that cools a fourth fluid by utilizing the refrigerant cooled by the heat source device, wherein
the controller
causes, when there is an operation request for the second use device and the fourth use device, a waste heat recovery operation to be performed in which the second use device heats the second fluid by utilizing a refrigerant heated by cooling the fourth fluid in the fourth use device, and
causes, even when there is no operation request for the first use device, the first use device to also operate if an amount of heat to be applied to the refrigerant by cooling the fourth fluid in the fourth use device is less than or equal to a predetermined second amount of heat and if the first use device satisfies the certain condition, and causes a waste heat recovery operation to be performed in which the second use device heats the second fluid by utilizing a refrigerant heated by cooling the first fluid and the fourth fluid in the first use device and the fourth use device.

13. The heat pump apparatus of claim 1, further comprising:
an annular first refrigerant passage in which a compressor, a first opening and closing mechanism, a first heat exchanger, a first pressure reducing mechanism, a second pressure reducing mechanism, and a second heat exchanger are sequentially connected with pipes, a second refrigerant passage that connects a node between the first pressure reducing mechanism and the second pressure reducing mechanism in the first refrigerant passage to a node between the compressor and the first opening and closing mechanism, wherein a third pressure reducing mechanism, a third heat exchanger, and a second opening and closing mechanism are sequentially connected, and a bypass passage that connects a node between the second heat exchanger and the compressor in the first refrigerant passage to a node between the first opening and closing mechanism and the first heat exchanger in the first refrigerant passage with a pipe, wherein a third opening and closing mechanism is provided in the middle of the pipe, wherein the heat source device includes at least the compressor and the first heat exchanger, the first use device includes at least the second heat exchanger, the second use device includes at least the third heat exchanger, and when the waste heat recovery operation is to be performed, the controller closes the first pressure reducing mechanism and the first opening and closing mechanism, and opens the second opening and closing mechanism, the third opening and closing mechanism, the second pressure reducing mechanism, and the third pressure reducing mechanism.

14. A control method for a heat pump apparatus, the heat pump apparatus including, a heat source device that cools or heats a refrigerant, a first use device that cools a first fluid by utilizing the refrigerant heated by the heat source device, and a second use device that heats a second fluid by utilizing the refrigerant cooled by the heat source device, the control method comprising:

causing, when there is an operation request for one of the first use device and the second use device, even when there is no operation request for the other, both the one and the other to operate if the other satisfies a certain condition;

causing a waste heat recovery operation to be performed in which the second use device heats the second fluid by utilizing a refrigerant heated by cooling the first fluid in the first use device;

determining that there is an operation request for the second use device if a temperature of the second fluid is less than or equal to a first heating temperature set by a user; and when there is the operation request for one of the first use device and the second use device, and both the one and the other are to operate, operating the second use device such that the temperature of the second fluid becomes a second heating temperature that is set higher than the first heating temperature by a certain degrees.

* * * * *